(12) United States Patent
Muratsu

(10) Patent No.: US 7,640,004 B2
(45) Date of Patent: Dec. 29, 2009

(54) WIRELESS LAN SYSTEM, WIRELESS TERMINAL, WIRELESS BASE STATION, COMMUNICATION CONFIGURATION METHOD FOR WIRELESS TERMINAL, AND PROGRAM THEREOF

(75) Inventor: Fumitake Muratsu, Tokyo (JP)

(73) Assignee: NEC Corporation, Tokyo (JP)

( * ) Notice: Subject to any disclaimer, the term of this patent is extended or adjusted under 35 U.S.C. 154(b) by 363 days.

(21) Appl. No.: 11/256,087

(22) Filed: Oct. 24, 2005

(65) Prior Publication Data

US 2006/0089127 A1    Apr. 27, 2006

(30) Foreign Application Priority Data

Oct. 25, 2004    (JP)    ............................. 2004-309514

(51) Int. Cl.
*H04B 7/00* (2006.01)
*H04L 9/32* (2006.01)
(52) U.S. Cl. ........................ 455/411; 455/41.2; 713/168
(58) Field of Classification Search ....................... None
See application file for complete search history.

(56) References Cited

U.S. PATENT DOCUMENTS

2001/0029178 A1* 10/2001 Criss et al. ................... 455/419

(Continued)

FOREIGN PATENT DOCUMENTS

JP    2000-23209 A    1/2000

(Continued)

OTHER PUBLICATIONS

Yoshiaki Okuyama et al., "Configuration data management method for wireless LAN communication", Research Report of the Information processing Society of Japan, Mar. 25, 2004, pp. 111-118, vol. 2004, No. 21, Information Processing Society of Japan, JP.

*Primary Examiner*—Nick Corsaro
*Assistant Examiner*—Joel Ajayi
(74) *Attorney, Agent, or Firm*—Sughrue Mion, PLLC

(57) ABSTRACT

A wireless LAN system in which a user who is already authorized to access a network need not repeat again the process of obtaining the authorization even when the network topology has changed, a wireless terminal, a wireless base station and a server used in the same. The wireless base station includes a configuration information storage for storing configuration version information indicating conditions to allow the wireless terminal to connect thereto, and a wireless communication configuration management section for transmitting a beacon containing the configuration version information. The wireless terminal includes a wireless communication interface for receiving the beacon from the wireless base station, and a configuration information management section for extracting the configuration version information from the beacon. The configuration information management section determines whether or not the communication configuration of the terminal satisfies the conditions indicated by the configuration version information. If not, the configuration information management section transmits a connection request to the wireless base station connected to a configuration server. After performing mutual authentication with the configuration server, the configuration information management section obtains configuration information previously stored in the server to reset the communication configuration of the terminal based on the configuration information. The configuration server includes a storage for storing the configuration information, an authenticator for performing mutual authentication with the wireless terminal, and a configuration information transmitter for transmitting the configuration information to the wireless terminal that has already been authenticated in response to a request from the terminal.

26 Claims, 15 Drawing Sheets

U.S. PATENT DOCUMENTS

| | | | |
|---|---|---|---|
| 2003/0084287 A1* | 5/2003 | Wang et al. | 713/168 |
| 2003/0115460 A1* | 6/2003 | Arai | 713/168 |
| 2003/0143989 A1* | 7/2003 | Ho et al. | 455/418 |
| 2004/0054774 A1* | 3/2004 | Barber et al. | 709/224 |
| 2004/0203693 A1* | 10/2004 | Mehta et al. | 455/419 |

FOREIGN PATENT DOCUMENTS

| | | |
|---|---|---|
| JP | 2002-112347 A | 4/2002 |
| JP | 2003-32275 A | 1/2003 |
| JP | 2003-92602 A | 3/2003 |
| JP | 2004-127187 A | 4/2004 |

\* cited by examiner

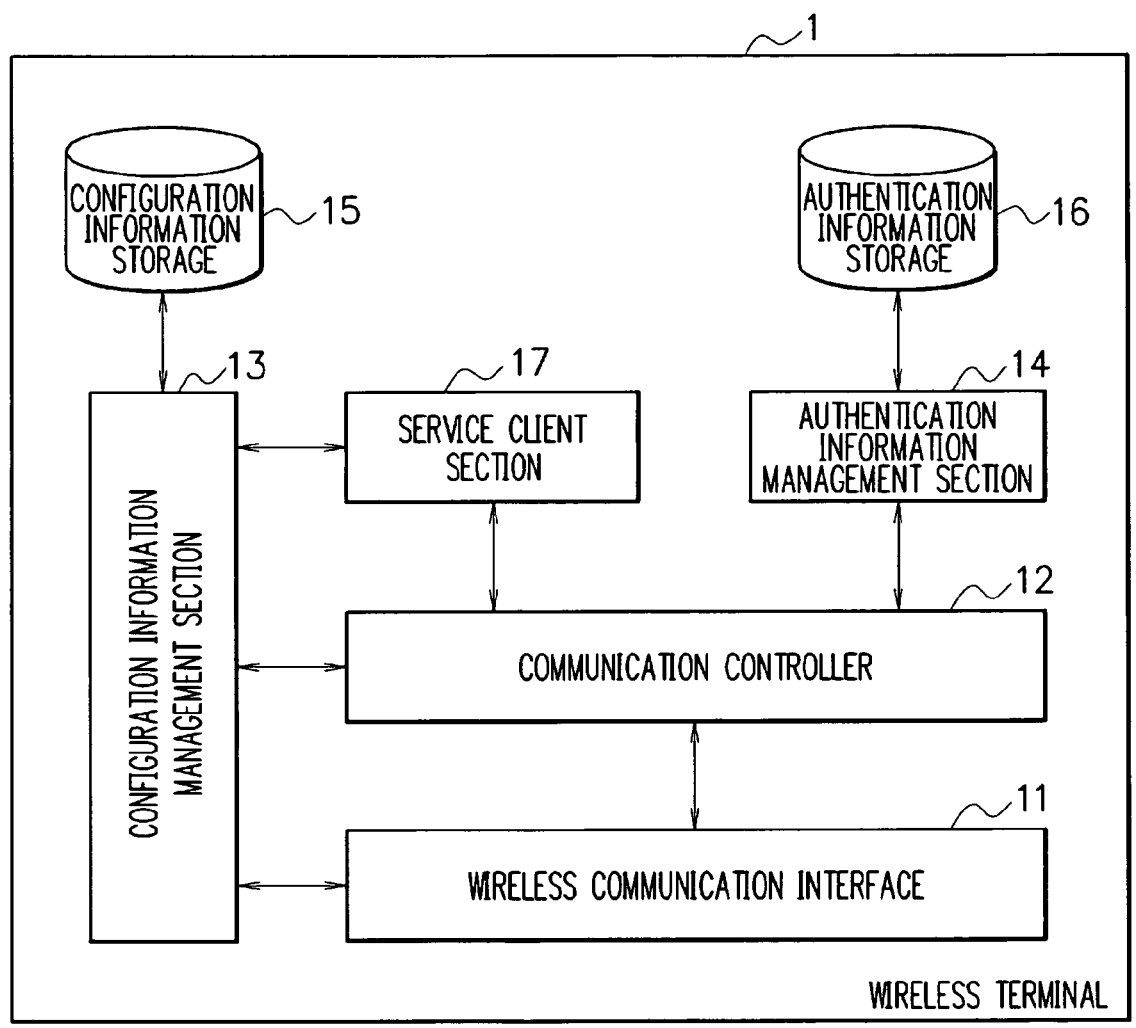
F I G. 2

```
<header>
            <CONFIGURATION VERSION>1.00</CONFIGURATION VERSION>
            <AP IDENTIFIER>xx:xx:xx:xx:xx</AP IDENTIFIER>
</header>
<configure>
            <AUTHENTICATION METHOD>WEP AUTHENTICATION</AUTHENTICATION METHOD>
            <WEP>********</WEP>
</configure>
```

F I G. 5
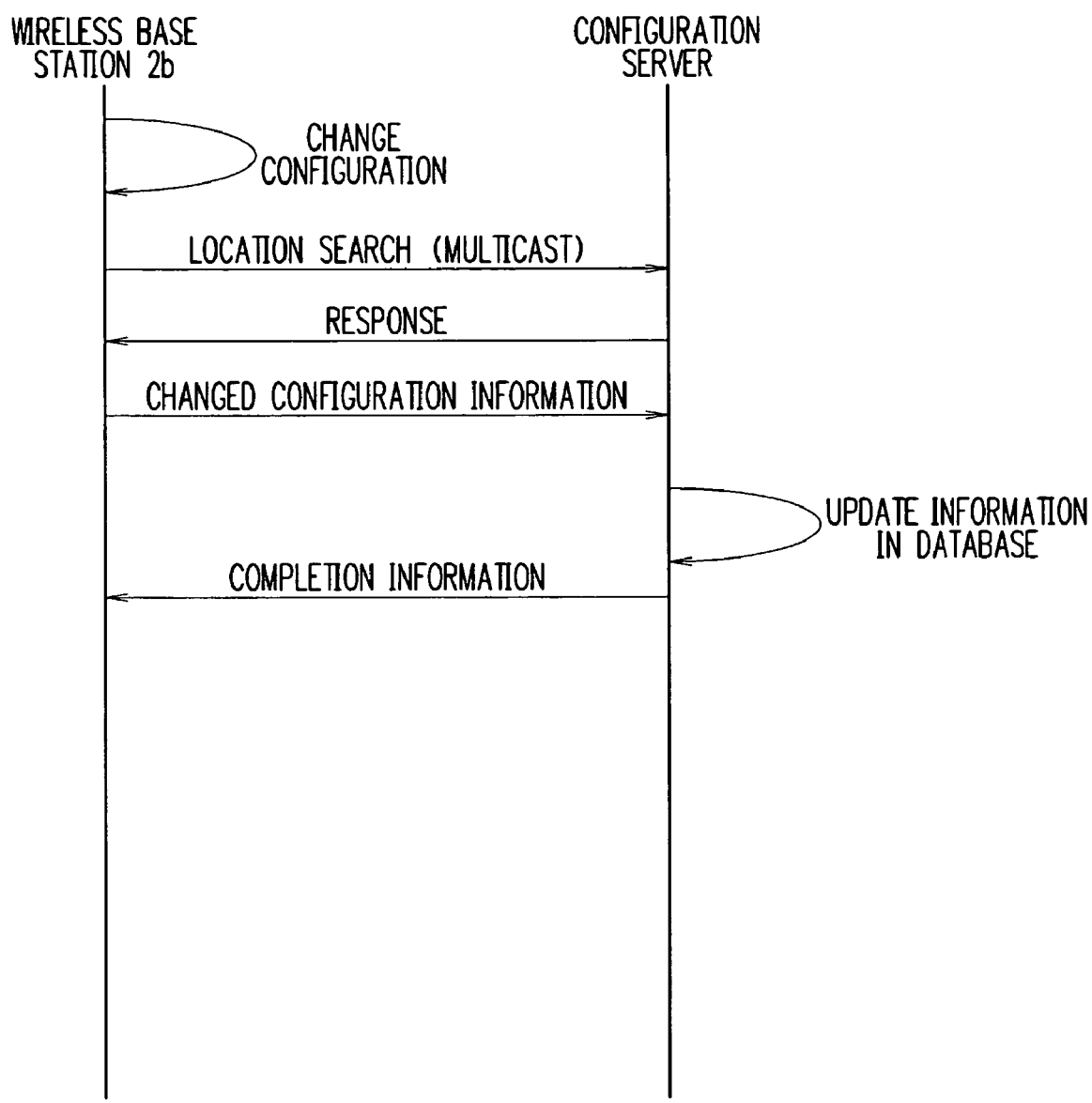

F I G. 6
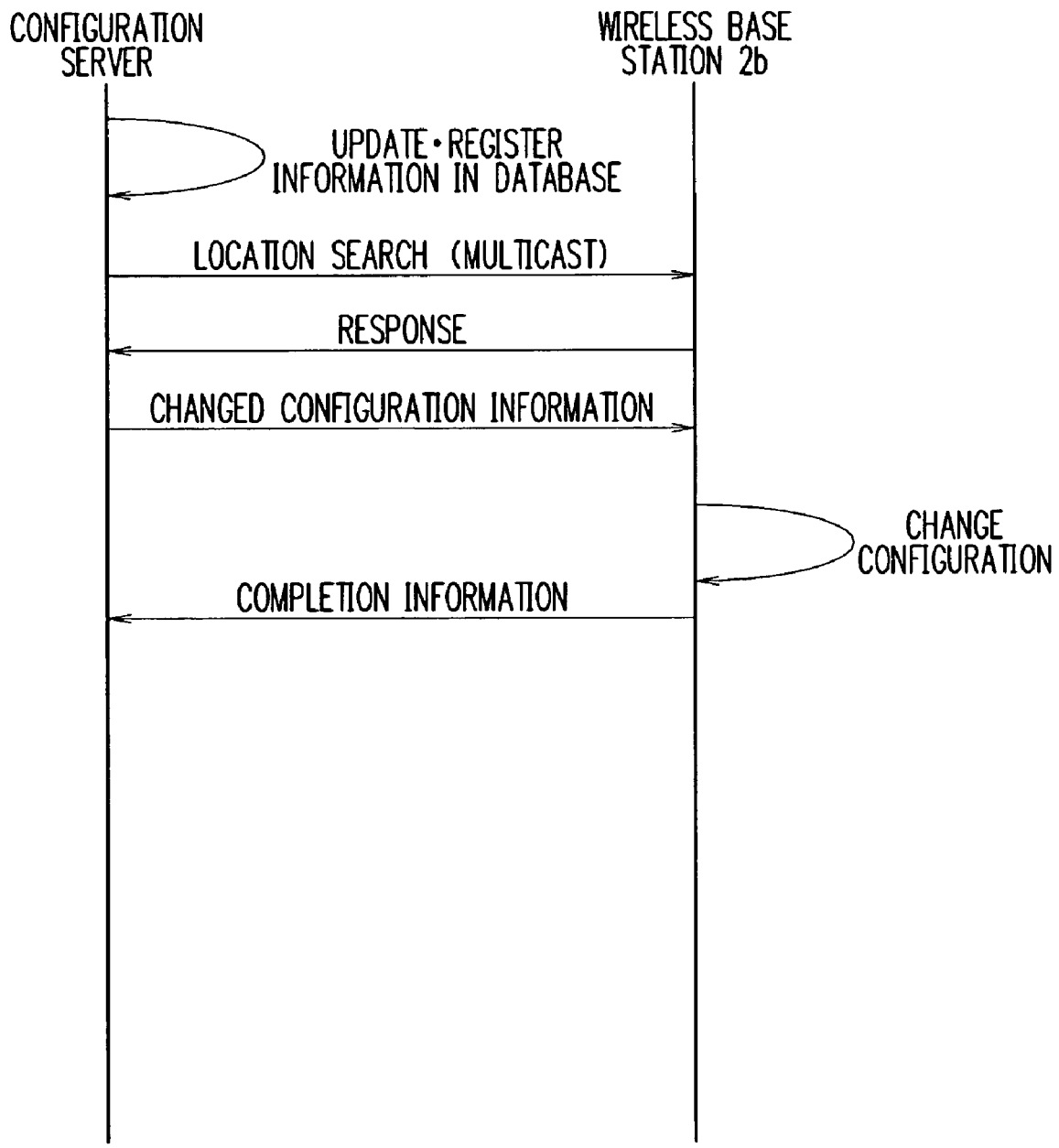

F I G. 10
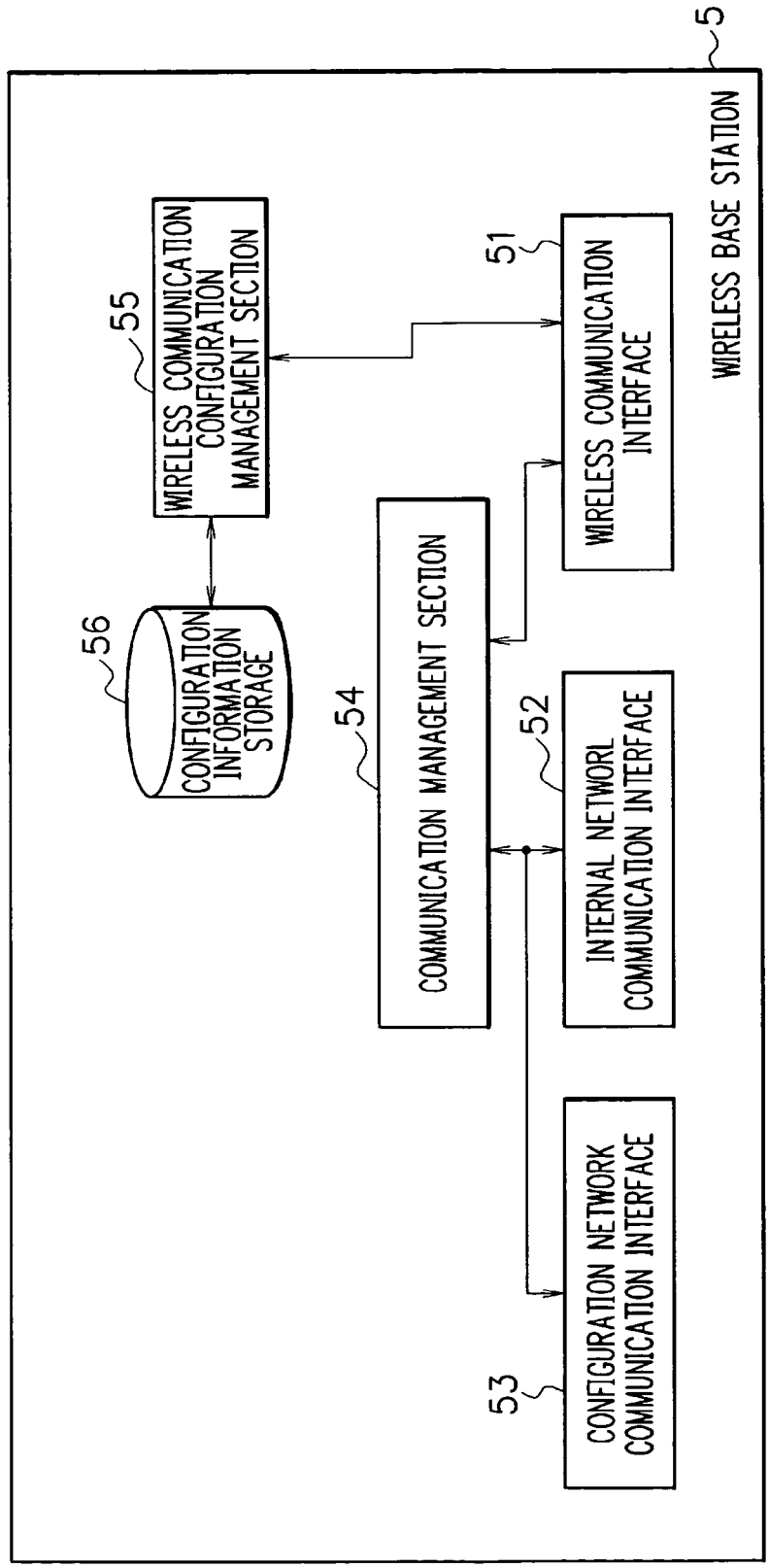

F I G. 14
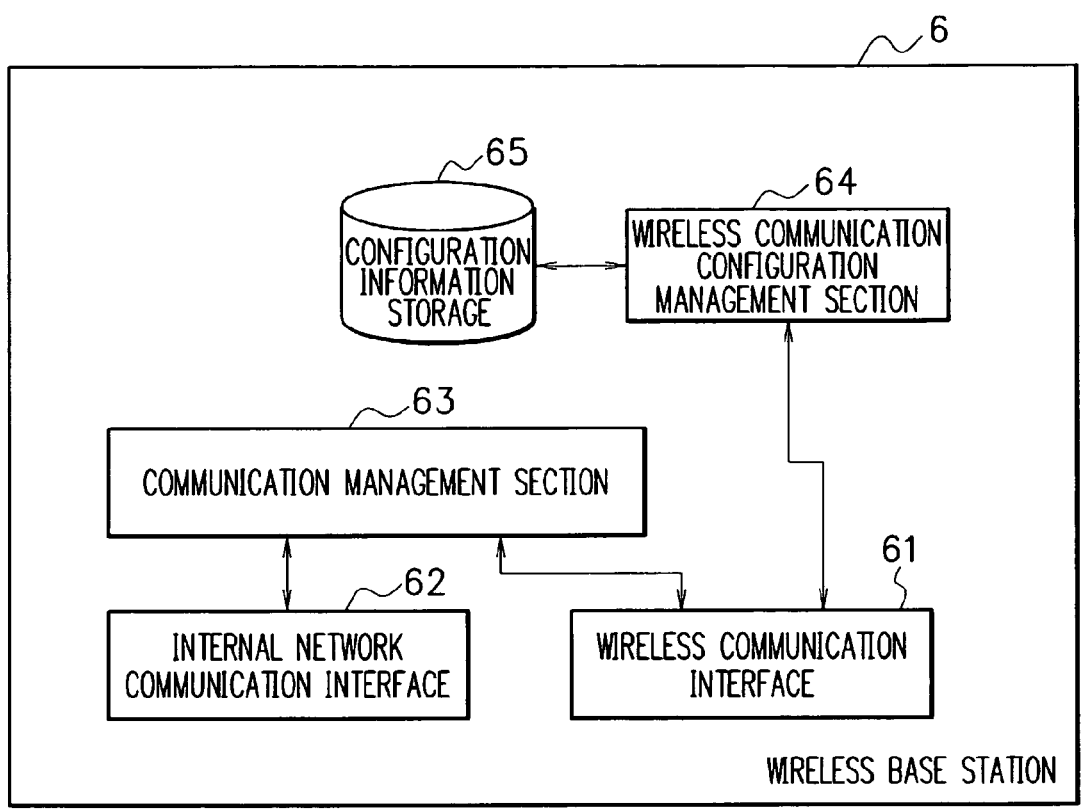

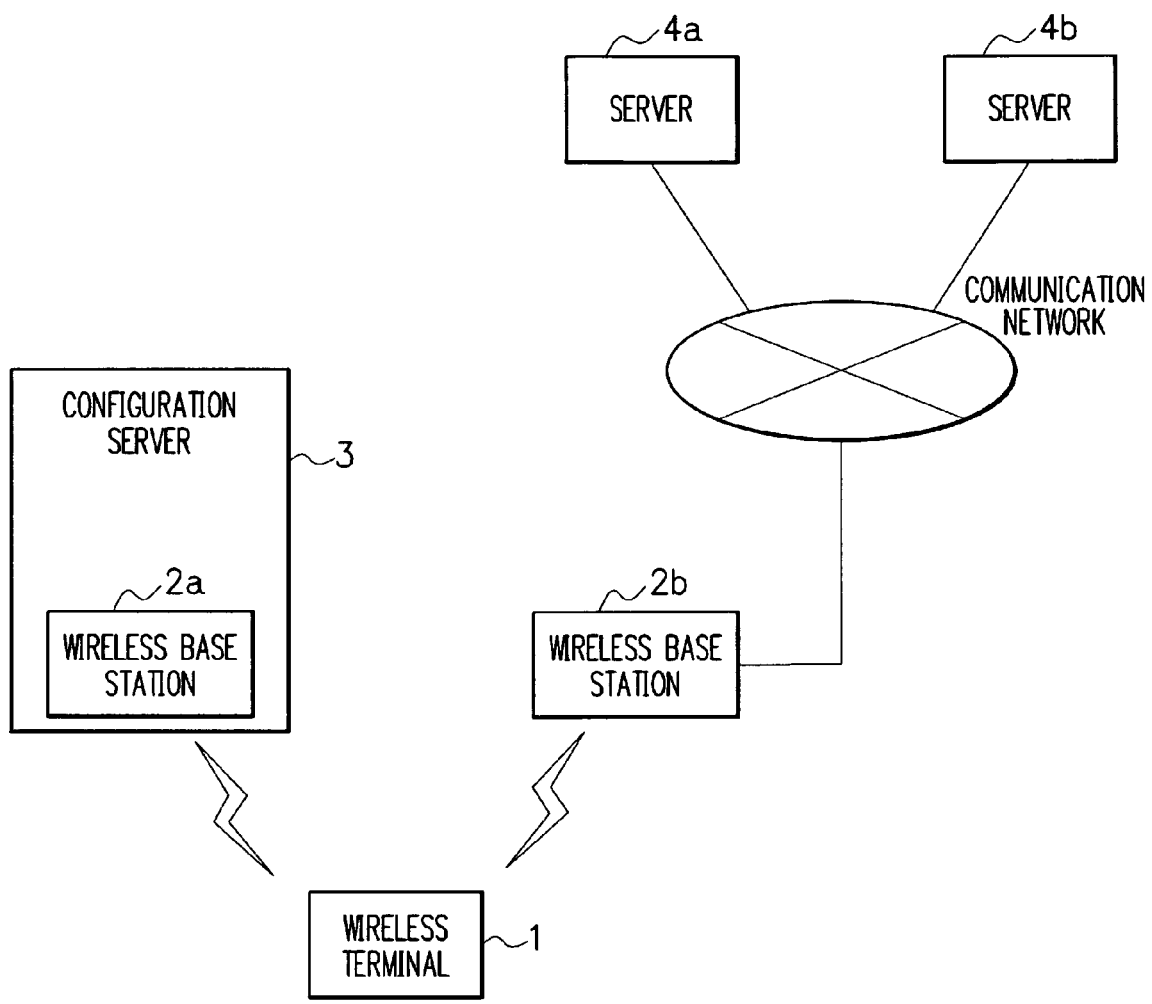

WIRELESS LAN SYSTEM, WIRELESS TERMINAL, WIRELESS BASE STATION, COMMUNICATION CONFIGURATION METHOD FOR WIRELESS TERMINAL, AND PROGRAM THEREOF

FIELD OF THE INVENTION

The present invention relates to a wireless LAN system, and more particularly, to a wireless LAN system in which a user who is already authorized to access a network need not repeat again the process of obtaining the authorization even when the network topology has changed, a wireless terminal and a wireless base station used in the same, a communication configuration method for the wireless terminal, and a program thereof.

BACKGROUND OF THE INVENTION

To a wireless LAN (Local Area Network) in the office or a public wireless LAN has been applied a method in which authorization information such as membership type, expiration date, etc. and configuration information such as WEP (Wired Equivalent Privacy) key, etc. are delivered to a wireless communication terminal of a user as an electronic ticket (computerized or electronic information). With the electronic ticket, the user is allowed to connect his/her wireless communication terminal such as computer, PDA (Personal Digital Assistant), etc. to an access point (also referred to as a public wireless hotspot in the public wireless LAN). Since authorization information and configuration information are distributed as electronic tickets to wireless communication terminals of respective users, the users can dispense with the need for inputting the information to their terminals manually. Consequently, usability or convenience is improved for the users.

According to the method, in general, electronic tickets are distributed through infrared data communication or short-range radio communication.

The user who has received an electronic ticket sets the wireless communication function of his/her wireless communication terminal based on authorization information and configuration information contained in the electronic ticket. Thereby, the user can connect the wireless communication terminal via an access point to a wireless LAN.

When, however, there is a change in the configuration information of a wireless base station as for example in the case where the network topology changes, it is necessary to inform each user who already has access permission (who has already received the electronic ticket) of the change in the configuration information of the base station.

The user needs to reset the wireless communication function of his/her wireless communication terminal based on the configuration information after the change.

As just described, in the conventional wireless LAN, when the network topology has changed, each user is required to download again a new electronic ticket even if the one previously received is still valid and he/she has not lost "access right to the network".

Besides, a network administrator has to distribute electronic tickets to users who have received it once, which increases network traffic.

In addition, it is inconvenient for users to take some time and trouble to download again a new electronic ticket. Downloading of an electronic ticket drains the battery of a wireless communication terminal and thereby reduces the operable time of the terminal.

As conventional techniques to facilitate the update of a control program for a mobile terminal, for example, Japanese Patent Application laid open Nos. 2000-23209 (Reference 1) and 2004-127187 (Reference 2) disclose "Control Program Management Device and Control Program Updating Method" and "Internet Access System", respectively.

According to Reference 1, when a mobile terminal connects to a base station, the control program management device checks whether or not the control program of the terminal is in the latest version. If not, the control program management device reads out the latest control program from a control program database and transmits it via the base station to the mobile terminal. Thus, the mobile terminal can update the control program.

According to Reference 2, the Internet access system is provided with first and second wireless LAN access points. The first wireless LAN access point can be accessed from an unspecified number of user terminals, while the second one is accessible only from specific user terminals which have been authenticated based on arbitrary authentication information. A user terminal first connects to the first wireless LAN access point. After an authentication server authenticates the user terminal, the terminal obtains access or configuration information. Based on the access information, the user terminal then connects to the second wireless LAN access point to access the Internet.

The technique described in Reference 1, however, is applicable only to a network in which a mobile terminal can establish communication with a base station even if it has not updated the control program.

In the wireless LAN, when the network topology has changed, a mobile terminal cannot use an access point (wireless base station) that has been available before. That is, the mobile terminal cannot even connect to the wireless base station. Therefore, the technique described in Reference 1 cannot be applied to the wireless LAN Besides, in the Internet access system described in Reference 2, a mobile terminal connects to the first wireless LAN access point to be authenticated by the authentication server every time it accesses the Internet. Consequently, when there is no need for obtaining configuration information through the first wireless LAN access point (when the mobile terminal has already obtained configuration information to connects to the second wireless LAN access point), the mobile terminal performs unnecessary processing. This causes an increase in the processing load of the user terminal as well as an increase in network traffic.

Additionally, in the Internet access system, user authentication is performed with a user ID or a password after the mobile terminal has connected to the second wireless LAN access point. In other words, no authentication is performed during communication through the first wireless LAN access point. As such, communication through the first wireless LAN access point is not protected at all by encryption, and it is undesirable in this situation to transmit/receive configuration information.

As is described above, there has not been proposed a wireless LAN system in which a change in the configuration of a wireless base station is automatically detected to update network configuration only for users who already have an electronic ticket.

SUMMARY OF THE INVENTION

It is therefore an object of the present invention to provide a wireless LAN system in which a user need not perform the process of obtaining configuration information even when connecting to a wireless base station whose necessary configuration information is unknown to the user, a wireless terminal and a wireless base station used in the same, a communication configuration method for the wireless terminal, and a program thereof.

In accordance with the first aspect of the present invention, to achieve the object mentioned above, there is provided a wireless LAN system comprising at least one wireless terminal in which communication configuration is set based on configuration information, a first wireless base station for connecting the wireless terminal that has connected thereto to a LAN, and a second wireless base station for connecting the wireless terminal that has connected thereto to a configuration server. The first wireless base station includes a storage for storing "configuration version information" representing a version of configuration information to indicate that the wireless terminal whose communication configuration has been set based on the configuration information in the version is allowed to connect to the base station, and a configuration version information transmitter for transmitting the configuration version information to the wireless terminal. The wireless terminal includes a configuration version information receiver for receiving the configuration version information from the first wireless base station, a version comparator for determining whether or not the version of the configuration information based on which the communication configuration of the terminal has been set matches the version indicated by the configuration version information, a connection request transmitter for transmitting a connection request to the second wireless base station when the version of the configuration information based on which the communication configuration of the terminal has been set does not match the version indicated by the configuration version information, an authenticator for performing mutual authentication with the configuration server, a configuration information receiver for obtaining configuration information previously stored in the configuration server that has already been authenticated, and a communication configuration changer for resetting the communication configuration of the terminal based on the configuration information obtained from the configuration server. The configuration server includes a storage for storing the configuration information, an authenticator for performing mutual authentication with the wireless terminal, and a configuration information transmitter for transmitting the configuration information to the wireless terminal that has already been authenticated in response to a request from the terminal.

Preferably, in the first aspect of the present invention, the first wireless base station transmits a beacon containing the configuration version information, and the wireless terminal extracts and obtains the configuration version information from the beacon received from the first wireless-base station.

In accordance with the second aspect of the present invention, there is provided a wireless LAN system comprising a first wireless base station for connecting a wireless terminal, in which communication configuration is set based on configuration information, to a LAN when the terminal has connected thereto, and a second wireless base station for connecting a wireless terminal that has connected thereto to a configuration server. The first wireless base station includes a storage for storing configuration version information representing a version of configuration information to indicate that the wireless terminal whose communication configuration has been set based on the configuration information in the version is allowed to connect to the base station, and a configuration version information transmitter for transmitting the configuration version information to the wireless terminal. The configuration server includes a storage for storing configuration information, an authenticator for performing mutual authentication with the wireless terminal, and a configuration information transmitter for transmitting the configuration information to the wireless terminal that has already been authenticated in response to a request from the terminal.

Preferably, in the second aspect of the present invention, the first wireless base station transmits a beacon containing the configuration version information.

In accordance with the third aspect of the present invention, there is provided a wireless LAN system comprising at least one wireless terminal and a wireless base station for connecting the wireless terminal that has connected thereto to a LAN or a configuration server. The wireless base station includes a storage for storing base station configuration version information representing a version of configuration information to indicate that the wireless terminal whose communication configuration has been set based on the configuration information in the version is allowed to connect to the LAN, a connection determining section for determining, in response to a connection request received from the wireless terminal, whether the terminal is to be connected to the LAN or the configuration server based on the base station configuration version information and terminal configuration version information contained in the connection request, and a connection informing section for informing the wireless terminal whether the terminal has been connected to the LAN or the configuration server. The wireless terminal includes a terminal configuration version information transmitter for transmitting the terminal configuration version information that indicates the version of configuration information based on which the communication configuration of the terminal has been set to the wireless base station with the connection request, an authenticator for performing mutual authentication with the configuration server when informed by the wireless base station that the terminal has been connected to the configuration server, a configuration information receiver for obtaining configuration information previously stored in the configuration server that has already been authenticated, and a communication configuration changer for resetting the communication configuration of the terminal based on the configuration information obtained from the configuration server. The configuration server includes a storage for storing the configuration information based on which the communication configuration of the wireless terminal is set to connect to the wireless base station, an authenticator for performing mutual authentication with the wireless terminal, and a configuration information transmitter for transmitting the configuration information to the wireless terminal that has already been authenticated in response to a request from the terminal.

In accordance with the fourth aspect of the present invention, there is provided a wireless LAN system including a wireless base station for connecting a wireless terminal, in which communication configuration is set based on configuration information, to a LAN or a configuration server when the terminal has connected thereto. The wireless base station includes a storage for storing base station configuration version information representing a version of configuration information to indicate that the wireless terminal whose communication configuration has been set based on the configuration information in the version is allowed to connect to the LAN, a connection determining section for determining, in response to a connection request received from the wireless terminal, whether the terminal is to be connected to the LAN or the configuration server based on the base station configuration version information and terminal configuration version information contained in the connection request indicating the version of the configuration information based on which the communication configuration of the terminal has been set, and a connection informing section for informing the wireless terminal whether the terminal has been connected to the LAN or the configuration server. The configuration server includes a storage for storing configuration information that indicates the communication configuration for the wireless terminal to connect to the wireless base station, an authenticator for performing mutual authentication with the wireless terminal, and a configuration information transmitter for transmitting the configuration information to the wireless terminal that has already been authenticated in response to a request from the terminal.

Preferably, in the third or fourth aspect of the present invention, the configuration server is located on a subnet logically different from the LAN, and the wireless base station determines, in response to a connection request received from the wireless terminal, whether the terminal is to be connected to the LAN or the configuration server by a VLAN (Virtual Local Area Network) tag.

In accordance with the fifth aspect of the present invention, there is provided a wireless terminal comprising a configuration version information receiver for receiving from a first wireless base station configuration version information representing a version of configuration information to indicate that the wireless terminal whose communication configuration has been set based on the configuration information in the version is allowed to connect to the base station, a version comparator for determining whether or not the version of configuration information based on which the communication configuration of the terminal has been set matches the version indicated by the configuration version information, a connection request transmitter for transmitting a connection request to a second wireless base station when the version of configuration information based on which the communication configuration of the terminal has been set does not match the version indicated by the configuration version information, an authenticator for performing mutual authentication with a configuration server connected to the second wireless base station, a configuration information receiver for obtaining configuration information indicating the communication configuration for the wireless terminal to connect to the wireless base station previously stored in the configuration server that has already been authenticated, and a communication configuration changer for resetting the communication configuration of the terminal based on the configuration information obtained from the configuration server.

Preferably, in the fifth aspect of the present invention, the wireless terminal extracts and obtains the configuration version information from a beacon received from the first wireless base station.

In accordance with the sixth aspect of the present invention, there is provided a wireless terminal which is connected to a LAN or a configuration server through a wireless base station, comprising a terminal configuration version information transmitter for transmitting terminal configuration version information that indicates the version of configuration information based on which the communication configuration of the terminal has been set to the wireless base station with a connection request, a connection information receiver for receiving from the wireless base station information as to whether the terminal has been connected to the LAN or the configuration server, an authenticator for performing mutual authentication with the configuration server when informed by the wireless base station that the terminal has been connected to the configuration server, a configuration information receiver for obtaining configuration information indicating conditions to connect to the LAN previously stored in the configuration server that has already been authenticated, and a communication configuration changer for resetting the communication configuration of the terminal based on the configuration information obtained from the configuration server.

In accordance with the seventh aspect of the present invention, there is provided a wireless base station including a configuration version information transmitter for transmitting to a wireless terminal configuration version information representing a version of configuration information to indicate that the wireless terminal whose communication configuration has been set based on the configuration information in the version is allowed to connect to the base station.

Preferably, in the seventh aspect of the present invention, the wireless base station transmits a beacon containing the configuration version information.

In accordance with the eighth aspect of the present invention, there is provided a wireless base station which connects a wireless terminal to a LAN or a configuration server, comprising a storage for storing base station configuration version information representing a version of configuration information to indicate that the wireless terminal whose communication configuration has been set based on the configuration information in the version is allowed to connect to the LAN, a connection determining section for determining, in response to a connection request received from the wireless terminal, whether the terminal is to be connected to the LAN or the configuration server based on the base station configuration version information and terminal configuration version information contained in the connection request indicating the version of configuration information based on which the communication configuration of the terminal has been set, and a connection informing section for informing the wireless terminal whether the terminal has been connected to the LAN or the configuration server.

In accordance with the ninth aspect of the present invention, there is provided a program implementing a communication configuration method for a wireless terminal, the program causing a computer that controls the wireless terminal to perform the steps of receiving from a first wireless base station configuration version information representing a version of configuration information to indicate that the wireless terminal whose communication configuration has been set based on the configuration information in the version is allowed to connect to the base station, determining whether or not the version of configuration information based on which the communication configuration of the terminal has been set matches the version indicated by the configuration version information, transmitting a connection request to a second wireless base station when the version of configuration information based on which the communication configuration of the terminal has been set does not match the version indicated by the configuration version information, performing mutual authentication with a configuration server connected to the second wireless base station, obtaining configuration information indicating the communication configuration for the wireless terminal to connect to the wireless base station previously stored in the configuration server that has already been authenticated, and resetting the communication configuration of the terminal based on the configuration information obtained from the configuration server.

Preferably, in the ninth aspect of the present invention, the wireless terminal extracts and obtains the configuration version information from a beacon received from the first wireless base station.

In accordance with the tenth aspect of the present invention, there is provided a program implementing a communication configuration method for a wireless terminal, the program causing a computer that controls the wireless terminal connected to a LAN or a configuration server through a wireless base station to perform the steps of transmitting terminal configuration version information that indicates the version of configuration information based on which the communication configuration of the terminal has been set to the wireless base station, receiving from the wireless base station information as to whether the terminal has been connected to the LAN or the configuration server in response to a connection request transmitted to the base station, performing mutual authentication with the configuration server when informed by the wireless base station that the terminal has been connected to the configuration server, obtaining configuration information indicating conditions to connect to the LAN from the configuration server that has already been authenticated, and resetting the communication configuration of the terminal based on the configuration information obtained from the configuration server.

Preferably, in the tenth aspect of the present invention, the wireless terminal transmits the terminal configuration version information to the wireless base station with the connection request.

In accordance with the eleventh aspect of the present invention, there is provided a communication configuration method for a wireless terminal applied to a wireless LAN system comprising at least one wireless terminal in which communication configuration is set based on configuration information, a first wireless base station for connecting the wireless terminal that has connected thereto to a LAN, and a second wireless base station for connecting the wireless terminal that has connected thereto to a configuration server. The communication configuration method comprising the steps of transmitting from the first wireless base station to the wireless terminal configuration version information representing a version of configuration information to indicate that the wireless terminal whose communication configuration has been set based on the configuration information in the version is allowed to connect to the base station, determining by the wireless terminal whether or not the version of the configuration information based on which the communication configuration of the terminal has been set matches the version indicated by the configuration version information obtained from the first wireless base station, transmitting by the wireless terminal a connection request to the second wireless base station when the version of the configuration information based on which the communication configuration of the terminal has been set does not match the version indicated by the configuration version information, performing mutual authentication between the wireless terminal and the configuration server, requesting by the wireless terminal configuration information previously stored in the configuration server that has already been authenticated, transmitting by the configuration server the configuration information to the wireless terminal that has already been authenticated in response to the request from the terminal, and resetting by the wireless terminal the communication configuration of the terminal based on the configuration information obtained from the configuration server.

Preferably, in the eleventh aspect of the present invention, the first wireless base station transmits a beacon containing the configuration version information, and the wireless terminal extracts and obtains the configuration version information from the beacon received from the first wireless base station.

In accordance with the twelfth aspect of the present invention, there is provided a communication configuration method for a wireless terminal applied to a wireless LAN system comprising at least one wireless terminal and a wireless base station for connecting the wireless terminal that has connected thereto to a LAN or a configuration server. The communication configuration method comprising the steps of transmitting from the wireless terminal to the wireless base station terminal configuration version information that indicates the version of configuration information based on which the communication configuration of the terminal has been set, transmitting from the wireless terminal to the wireless base station a connection request, determining by the wireless base station, in response to the connection request received from the wireless terminal, whether the terminal is to be connected to the LAN or the configuration server based on the terminal configuration version information received from the terminal and base station configuration version information representing a version of configuration information to indicate that the wireless terminal whose communication configuration has been set based on the configuration information in the version is allowed to connect to the LAN, informing the wireless terminal by the wireless base station whether the terminal has been connected to the LAN or the configuration server, performing by the wireless terminal mutual authentication with the configuration server when the terminal is informed by the wireless base station that the terminal has been connected to the configuration server, requesting by the wireless terminal configuration information previously stored in the configuration server that has already been authenticated, transmitting by the configuration server the configuration information to the wireless terminal that has already been authenticated in response to the request from the terminal, and resetting by the wireless terminal the communication configuration of the terminal based on the configuration information obtained from the configuration server.

Preferably, in the twelfth aspect of the present invention, the wireless terminal transmits the terminal configuration version information to the wireless base station with the connection request.

As set forth hereinabove, in accordance with the present invention, there can be provided a wireless LAN system in which a user who is already authorized to access a network need not repeat again the process of obtaining the authorization even when the network topology has changed, a wireless terminal and a wireless base station used in the same, a communication configuration method for the wireless terminal, and a program thereof.

BRIEF DESCRIPTION OF THE DRAWINGS

The exemplary aspects and features of the present invention will become more apparent from the consideration of the following detailed description taken in conjunction with the accompanying drawings in which:

FIG. 2 is a block diagram showing the construction of a wireless terminal in the wireless LAN system depicted in FIG. 1;

FIG. 5 is a sequence diagram showing an example of the operation of the wireless base station in the wireless LAN system to store configuration information in a configuration server;

FIG. 6 is a sequence diagram showing another example of the operation of the wireless base station in the wireless LAN system to store configuration information in the storage;

FIG. 10 is a block diagram showing the construction of a wireless base station in the wireless LAN system depicted in FIG. 9;

FIG. 14 is a block diagram showing the construction of a wireless base station in the wireless LAN system depicted in FIG. 13;

FIG. 16 is a block diagram showing the construction of a wireless LAN system in which a wireless base station is integrated with a configuration server.

DESCRIPTION OF THE PREFERRED EMBODIMENTS

Figure 1:
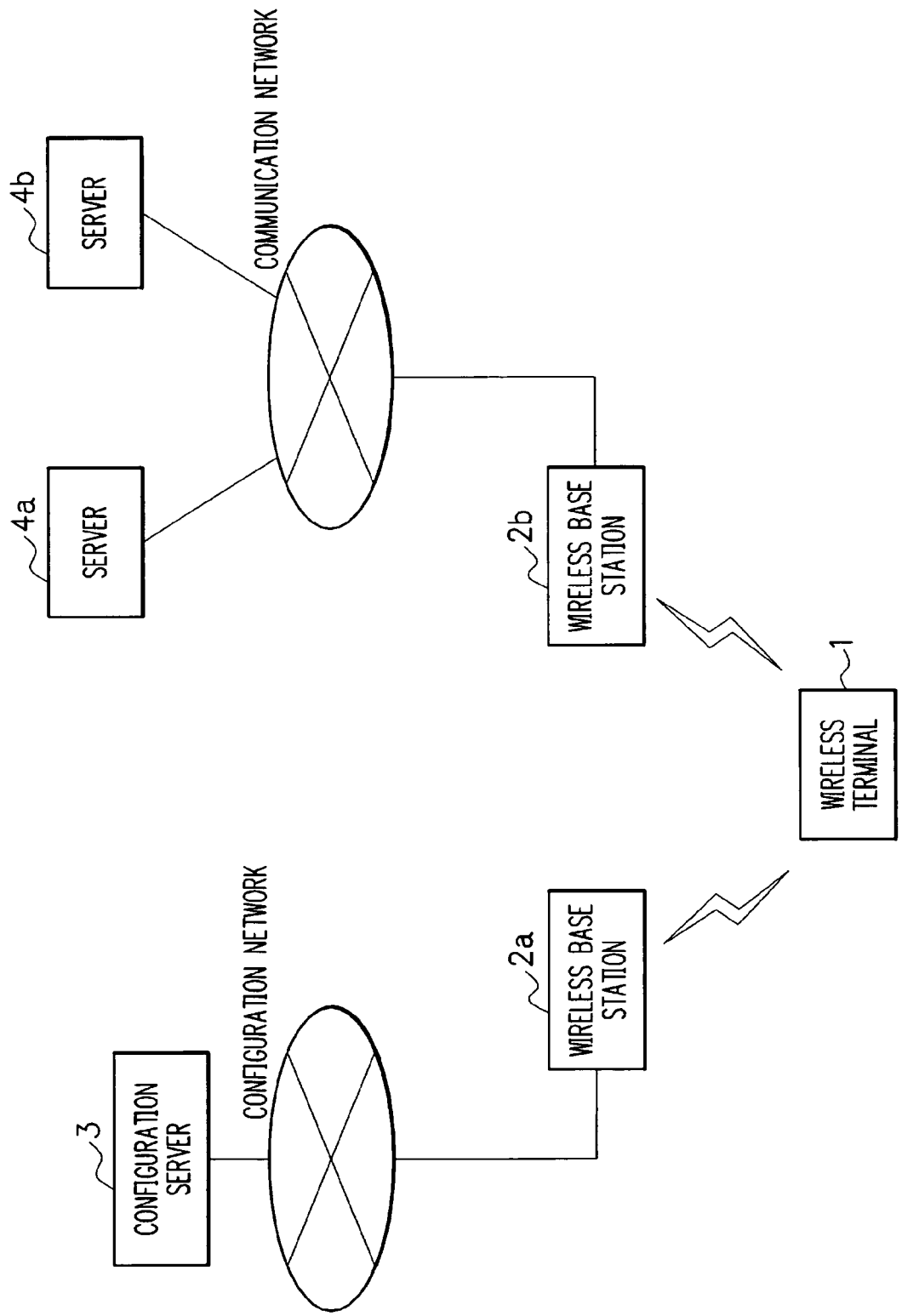
FIG. 1 is a block diagram showing the construction of a wireless LAN system according to the first embodiment of the present invention.

Referring now to the drawings, a description of preferred embodiments of the present invention will be given in detail.

First Embodiment

FIG. 1 is a block diagram showing the construction of a wireless LAN system according to the first embodiment of the present invention. Referring to FIG. 1, the wireless LAN system comprises a wireless terminal 1, wireless base stations 2 (2a and 2b), a configuration server 3, and servers 4 (4a and 4b). Incidentally, in the following description, each of the wireless base stations 2 will be denoted by 2a or 2b only when they need to be differentiated from each other. The same will apply to the servers 4.

The wireless terminal 1 communicates with the servers 4 located on a communication network, and thereby the user receives services offered by the servers 4. The wireless base station 2 connects the wireless terminal 1 that has connected thereto to a network. The configuration server 3 is located on a configuration wireless network and provided with a built-in or external database (not shown). The configuration server 3 sends configuration information (information necessary for the wireless terminal 1 to access the communication network) stored in the database to the terminal 1 in response to a request therefrom. The servers 4 on the communication network provide the wireless terminal 1 with general services.

FIG. 2 is a block diagram showing the construction of the wireless terminal 1. As can be seen in FIG. 2, the wireless terminal 1 includes a wireless communication interface 11, a communication controller 12, a configuration information management section 13, an authentication information management section 14, a configuration information storage 15, an authentication information storage 16, and a service client section 17.

In addition to the same functions as those of a general wireless LAN interface, the wireless communication interface 11 has a function to obtain configuration version information from a beacon received from the wireless base station 2. The communication controller 12 has a function to communicate with the configuration server 3 and the servers 4 and is capable of communication, for example, in the TCP/IP (Transmission Control Protocol/Internet Protocol) and UDP/IP (User Datagram Protocol/Internet Protocol) layers. The configuration information management section 13 obtains configuration information from the configuration server 3 to store it in the configuration information storage 15. The configuration information management section 13 also reads out configuration information (information necessary for wireless communication or service usage) stored in the configuration information storage 15 to feed it to the wireless communication interface 11, the communication controller 12 or the service client section 17. Further, the configuration information management section 13 compares configuration version information. The authentication information management section 14 has a function to perform mutual authentication with the configuration server 3. The configuration information storage 15 stores configuration version information obtained from the wireless base station 2 and configuration information obtained from the configuration server 3. The authentication information storage 16 stores authentication information necessary to obtain configuration information from the configuration server 3. The service client section 17 communicates with the servers 4 on the communication network to receive services offered by the servers 4. The service client section 17 is implemented on the CPU (Central Processing Unit) that controls the wireless terminal 1 by executing software. When communication configuration is required to access the configuration server 3 or the servers 4, the service client section 17 fetches configuration information from the configuration information management section 13.

Figures 3, 4:
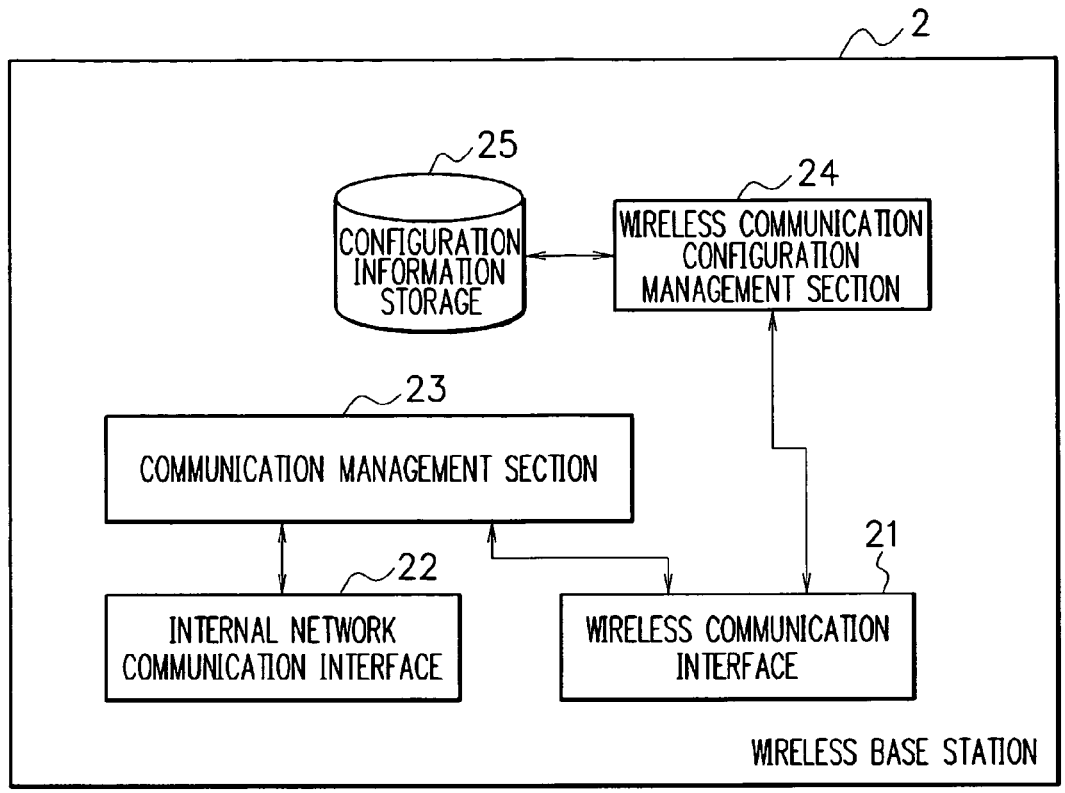
FIG. 3 is a block diagram showing the construction of a wireless base station in the wireless LAN system depicted in FIG. 1.
FIG. 4 is a diagram showing an example of the contents of configuration information.

FIG. 3 is a block diagram showing the construction of the wireless base station 2. The wireless base station 2 includes a wireless communication interface 21, an internal network communication interface 22, a communication management section 23, a wireless communication configuration management section 24, and a configuration information storage 25. Incidentally, each of the functional sections of the wireless base stations 2a and 2b will be differentiated from each other by reference characters "a" and "b". For example, the wireless communication interface 21 will be hereinafter denoted by 21a or 21b if necessary to indicate whether it belongs to the wireless base station 2a or 2b.

In addition to the same functions as those of a general wireless LAN interface, the wireless communication interface 21 has a function to transmit information on the version of the current configuration (configuration version information) with a beacon. Additionally, the wireless communication interface 21a also transmits, by a beacon, information indicating that the wireless base station 2a is an access point accessible without security for configuration. For example, a beacon may include a flag indicating that the wireless base station is an access point accessible without security. Or, version information represented by a specific character (":", etc.) may be previously defined as to indicate that the wireless base station is an access point accessible without security. The internal network communication interface 22 is an interface with a network (public wireless network or configuration network) to which it performs relaying, and has the same functions as those of a general LAN interface. The communication management section 23 has the same functions as those of a general hub or router, and relays packet data exchanged between the wireless communication interface 21 and the internal network communication interface 22. The wireless communication configuration management section 24 inputs configuration information necessary for the wireless terminal 1 to connect thereto (to the wireless base station 2) to the wireless communication interface 21. The wireless communication configuration management section 24 also allocates a configuration version to configuration information and outputs it to the wireless communication interface 21. The configuration information storage 25 stores configuration information necessary for the wireless terminal 1 to connect thereto (to the wireless base station 2).

FIG. 4 is a diagram showing an example of the contents of configuration information. As shown in FIG. 4, configuration information consists of "header" and "configure". The "header" includes at least <configuration version> and <AP (Access Point) identifier>. The <configuration version> indicates the version of configuration information, while the <AP identifier> indicates a wireless base station corresponding to the configuration information. In addition, the "header" may include an identifier indicating that the wireless base station is an access point accessible without security.

The "configure" is a substantive data for communication configuration, such as authentication method or system and authentication key, used by the wireless base station to determine whether or not to allow a wireless terminal to connect thereto.

In the following, the operation of the wireless LAN system of the first embodiment will be described.

FIG. 5 is a sequence diagram showing an example of the operation of the wireless base station 2b to store configuration information in the configuration server 3. First, a description will be given of the procedures through which the wireless base station 2b stores configuration information in the configuration server 3 referring to FIG. 5.

When there is a change in the configuration information of the wireless base station 2b, the changed information is stored in the configuration information storage 25b. In order to obtain the IP address of the configuration server 3, the wireless communication configuration management section 24b transmits multicast packets for location search. Having received the multicast packet from the wireless base station 2b, the configuration server 3 transmits in response its IP address to the base station 2b. When informed of the IP address by the configuration server 3, the wireless communication configuration management section 24b of the wireless base station 2b reads out the configuration information stored in the configuration information storage 25b to transmit it to the server 3 through the wireless communication interface 21b. On receipt of the configuration information from the wireless base station 2b, the configuration server 3 writes the information to the database (not shown). After writing the configuration information to the database, the configuration server 3 informs the wireless base station 2b that the information has been written to the database.

Thus, the configuration information of the wireless base station 2b is stored in the configuration server 3.

Besides, the configuration information of the wireless base station 2b may be previously registered in the configuration server 3 so that the communication configuration of the base station 2b is set based on the information. FIG. 6 is a sequence diagram showing another example of the operation of the wireless base station 2b to store configuration information in configuration information storage 25b.

A network administrator updates the configuration information of the wireless base station 2b stored in the database (not shown) of the configuration server 3, or newly writes the information to the database. In order to obtain the IP address of the wireless base station 2b, the configuration server 3 transmits multicast packets for location search. Having received the multicast packet from the configuration server 3, the wireless base station 2b in response transmits its IP address to the server 3. When informed of the IP address by the wireless base station 2b, the configuration server 3 reads out the configuration information stored in the database to transmit it to the base station 2b. On receipt of the configuration information from the configuration server 3, the wireless communication configuration management section 24b of the wireless base station 2b writes the information to the configuration information storage 25b. After writing the configuration information to the configuration information storage 25b, the wireless communication configuration management section 24b informs the configuration server 3 that the information has been written to the storage 25b.

Thus, the communication configuration of the wireless base station 2b can be changed based on the configuration information registered in the configuration server 3.

Although, in the above description, the wireless base station 2b and the configuration server 3 each use multicast packets to locate the other, broadcast packets may be used for location search in stead of multicast packets.

Besides, in each operation described above, if the wireless base station 2b and the configuration server 3 cannot communicate with each other with multicast packets (e.g. when a gateway is set between the wireless base station 2b and the configuration server 3 not to allow multicast packets to pass therethrough), the base station 2b or the server 3 needs to obtain the IP address of the other in advance. In such a case, it is obvious that the steps of the location search with multicast packets and the response thereto are skipped in the sequence of the operation.

Figure 7:
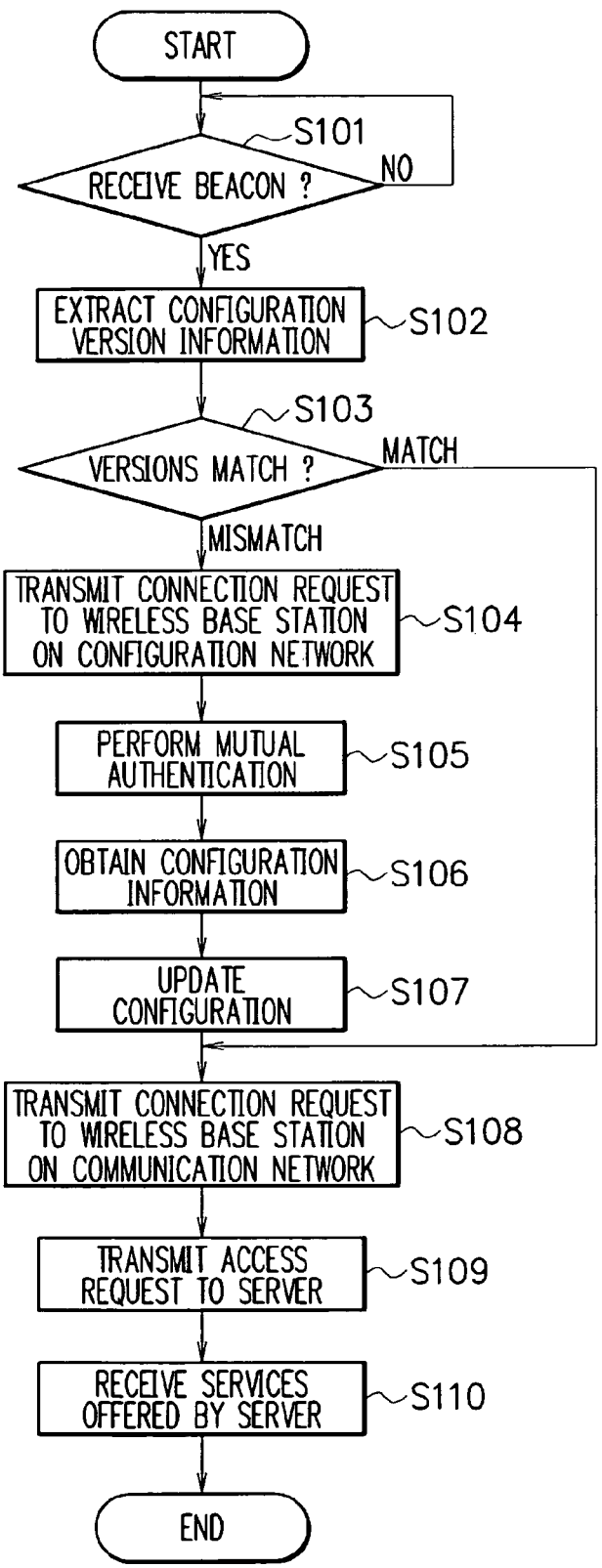
FIG. 7 is a flowchart showing the operation of the wireless terminal in the wireless LAN system.

FIG. 7 is a flowchart showing the operation of the wireless terminal 1 to request a connection to the server 4.

First, the wireless terminal 1 is in a wait state for a beacon from the wireless base station 2b (step S101). When the wireless terminal 1 receives a beacon (step S101/YES), the wireless communication interface 11 extracts configuration version information from the beacon (step S102). The wireless communication interface 11 sends the configuration information management section 13 the configuration version information extracted from the beacon. The configuration information management section 13 compares the configuration version information extracted from the beacon with that stored in the configuration information storage 15 (step S103).

When the two versions indicated by the configuration version information do not match (step S103/MISMATCH), the wireless communication interface 11 transmits a connection request to the wireless base station 2a on the configuration wireless network (step S104).

The mismatch between the two versions may be caused by, for example, a change in the network topology of the communication network.

When the wireless base station 2a receives the connection request from the wireless terminal 1, the wireless communication configuration management section 24a informs the terminal 1 of the allowance of the request through the wireless communication interface 21a.

After connecting to the wireless base station 2a, the wireless terminal 1 performs mutual authentication with the configuration server 3 (step S105).

More specifically, the configuration information management section 13 transmits an authentication request to the configuration server 3 through the wireless communication interface 11. In response to the authentication request from the wireless terminal 1, the configuration server 3 performs prescribed authentication to inform the terminal 1 of the result of the authentication. If the authentication is successful, the configuration server 3 transmits its authentication request with the authentication result.

When the wireless terminal 1 receives the authentication request from the configuration server 3, the authentication information management section 14 authenticates the server 3 based on information stored in the authentication information storage 16. If the authentication is successful, the authentication information management section 14 requests the communication controller 12 to inform the configuration server 3 of the successful authentication. In response to the request from the authentication information management section 14, the communication controller 12 informs the configuration server 3 of the successful authentication through the wireless communication interface 11.

On completion of the mutual authentication between the wireless terminal 1 and the configuration server 3, the configuration information management section 13 transmits a request for configuration information to the configuration server 3 through the wireless communication interface 11. The wireless terminal 1 receives configuration information transmitted from the configuration server 3 in response to the request (step S106).

Based on the configuration information newly obtained from the configuration server 3, the configuration information management section 13 changes the communication configuration of the wireless terminal 1 (step S107). After the communication configuration has been changed, the wireless communication interface 11 transmits a connection request associated with configuration version information to the wireless base station 2b on the communication network (step S108). Having informed of the allowance of the connection request by the wireless base station 2b, the wireless terminal 1 connects to the base station 2b.

When the wireless terminal 1 connects to the wireless base station 2b, the communication controller 12 transmits an access request to the server 4 on the communication network through the wireless communication interface 11 (step S109).

In response to the access request from the wireless terminal 1, the server 4 authenticates the terminal 1. When the wireless terminal 1 is allowed to access the server 4, communication is established therebetween. Thus, the service client section 17 communicates with the server 4 using TCP/IP or UDP/IP to receive services from the server 4 (step S110).

The operation described above is implemented with the CPU (not shown) that controls the wireless terminal 1 by executing a program stored in a ROM (Read Only Memory) not shown in the drawings. Incidentally, the CPU is cited by way of example and without limitation, and a processor such as DSP (Digital Signal Processor) provided with the program for implementing the operation can also be used.

Figure 8:
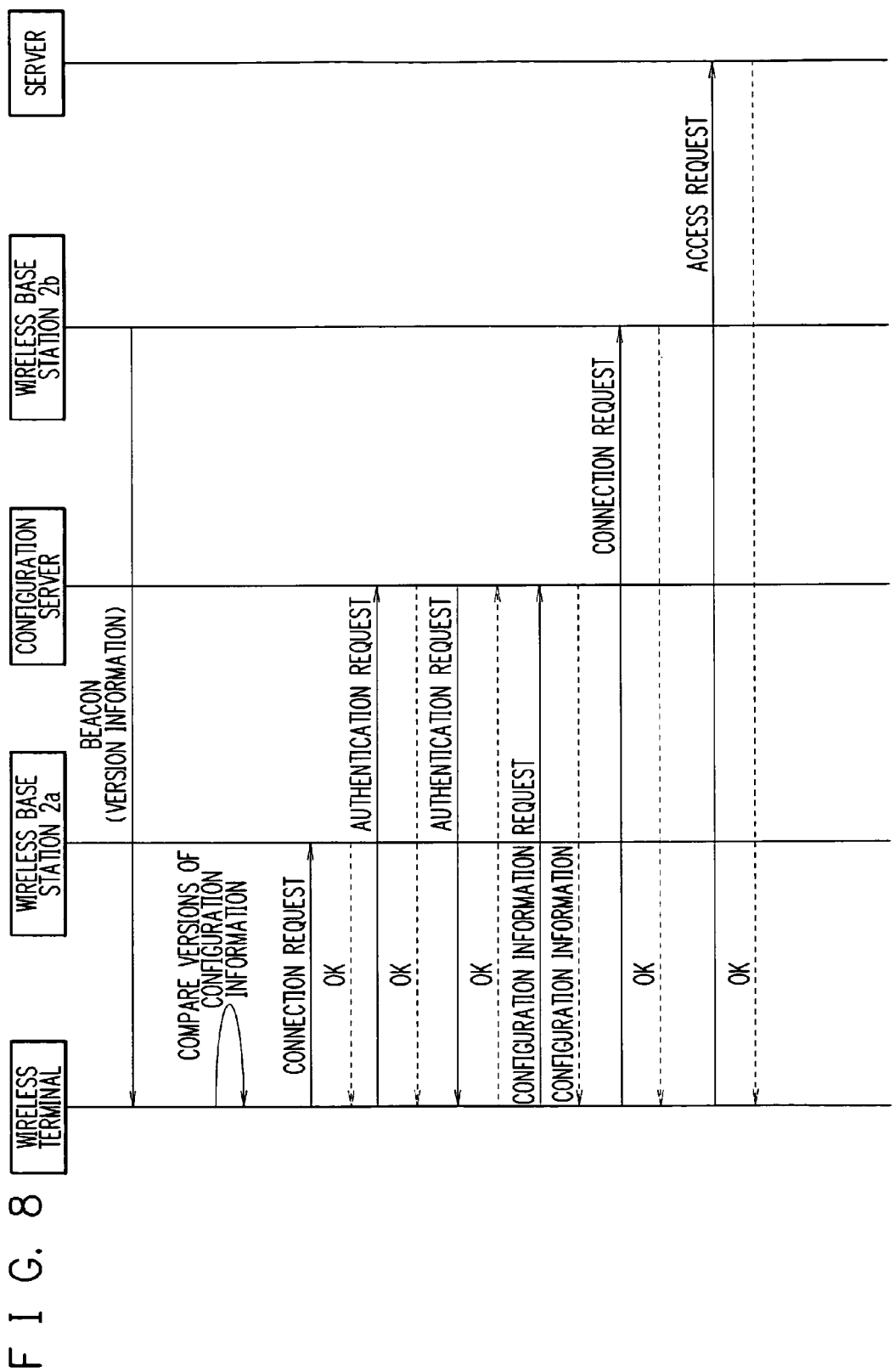
FIG. 8 is a sequence diagram showing an example of the operation of the wireless LAN system.

FIG. 8 is a sequence diagram showing an example of the operation of the wireless LAN system of this embodiment.

In the configuration information storage 25b of the wireless base station 2b is stored configuration version information corresponding to the network topology of the communication network. The wireless communication interface 21b transmits information on the version of the current configuration with a beacon.

When the wireless terminal 1 receives the beacon, the wireless communication interface 11 extracts the configuration version information from the beacon to send it to the configuration information management section 13. The configuration information management section 13 compares the configuration version information extracted from the beacon with that stored in the configuration information storage 15.

In FIG. 8, it is assumed that the two versions indicated by the configuration version information do not match at this point. Accordingly, the wireless communication interface 11 transmits a connection request to the wireless base station 2a on the configuration wireless network.

When the wireless base station 2a receives the connection request from the wireless terminal 1, the wireless communication configuration management section 24a informs the terminal 1 of the allowance of the request through the wireless communication interface 21a.

After the wireless terminal 1 connects to the wireless base station 2a, the configuration information management section 13 transmits an authentication request to the configuration server 3 through the wireless communication interface 11.

In response to the authentication request from the wireless terminal 1, the configuration server 3 performs prescribed authentication. If the authentication is successful, the configuration server 3 informs the wireless terminal 1 of the successful authentication and transmits its authentication request to the terminal 1.

When the wireless terminal 1 receives the authentication request from the configuration server 3, the authentication information management section 14 authenticates the server 3 based on information stored in the authentication information storage 16. If the authentication is successful, the authentication information management section 14 requests the communication controller 12 to inform the configuration server 3 of the successful authentication. In response to the request from the authentication information management section 14, the communication controller 12 informs the configuration server 3 of the successful authentication through the wireless communication interface 11.

On completion of the mutual authentication between the wireless terminal 1 and the configuration server 3, the configuration information management section 13 transmits a request for configuration information to the configuration server 3 through the wireless communication interface 11.

The configuration server 3 transmits configuration information to the wireless terminal 1 in response to the request therefrom.

Based on the configuration information newly obtained from the configuration server 3, the configuration information management section 13 changes the communication configuration of the wireless terminal 1. After that, the configuration information management section 13 transmits a connection request associated with configuration version information to the wireless base station 2b on the communication network.

When the wireless base station 2b receives the connection request from the wireless terminal 1, the wireless communication configuration management section 24b compares the configuration version information stored in the configuration information storage 25b with that associated with the connection request from the terminal 1.

In FIG. 8, it is assumed that the two versions indicated by the configuration version information match at this point. Accordingly, the wireless communication configuration management section 24b informs the wireless terminal 1 of the allowance of the connection request through the wireless communication interface 21b.

When the wireless terminal 1 connects to the wireless base station 2b, the communication controller 12 transmits an access request to the server 4 on the communication network through the wireless communication interface 11.

In response to the access request from the wireless terminal 1, the server 4 authenticates the terminal 1. If the authentication is successful, the server 4 informs the wireless terminal 1 of the allowance of the access request.

After communication is established between the wireless terminal 1 and the server 4, the service client section 17 communicates with the server 4 using TCP/IP or UDP/IP to receive services from the server 4.

As is described above, in the wireless LAN system of the first embodiment, when the network topology has changed, the wireless terminal obtains configuration version information from the configuration server. Thus, the wireless terminal need not receive reissuance of an electronic ticket to connect to the wireless base station.

Incidentally, in the above description, the wireless base station 2b on the communication network transmits configuration version information with a beacon. However, configuration version information is not necessarily contained in a beacon, and they may be transmitted individually.

Second Embodiment

Figure 9:
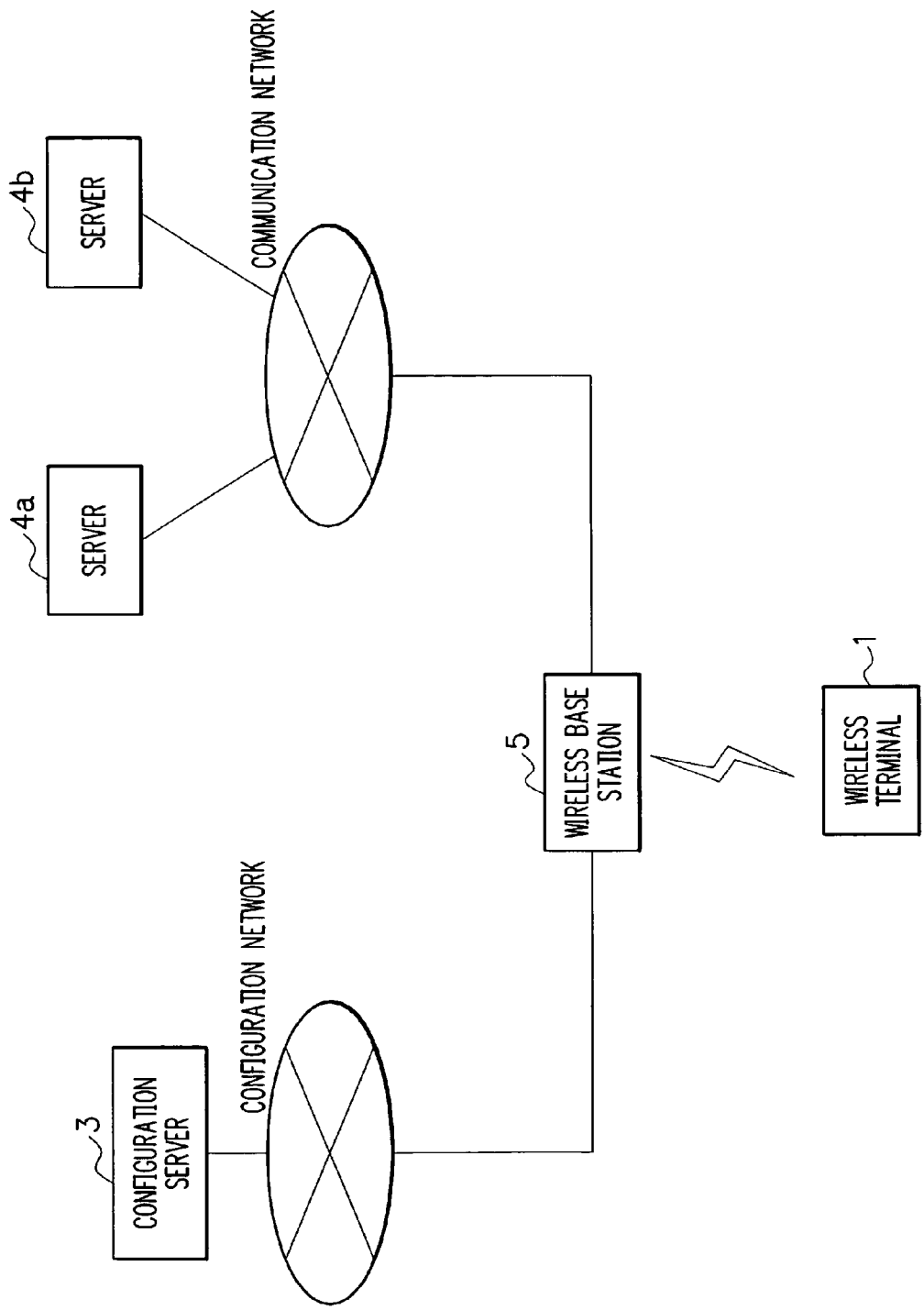
FIG. 9 is a block diagram showing the construction of a wireless LAN system according to the second embodiment of the present invention.

FIG. 9 is a block diagram showing the construction of a wireless LAN system according to the second embodiment of the present invention. Referring to FIG. 9, the wireless LAN system comprises a wireless terminal 1, a configuration server 3, servers 4 (4a and 4b), and a wireless base station 5.

The wireless terminal 1, the configuration server 3 and the servers 4 are similar to those of the first embodiment.

FIG. 10 is a block diagram showing the construction of the wireless base station 5. The wireless base station 5 includes a wireless communication interface 51, an internal network communication interface 52, a configuration network communication interface 53, a communication management section 54, a wireless communication configuration management section 55, and a configuration information storage 56.

The wireless communication interface 51 is a general wireless LAN interface. The internal network communication interface 52 is an interface with a network (public wireless network) to which it performs relaying. The internal network communication interface 52 has the same functions as those of a general LAN interface, and an arbitrary security policy is applied to communication with the wireless terminal 1 via the interface 52. Examples of the security policy include encryption with a WEP key and 1× authentication. The configuration network communication interface 53 is an interface with a network (configuration network) to which it performs relaying. The configuration network communication interface 53 has the same functions as those of a general LAN interface. To communication with the wireless terminal 1 via the interface 53 is applied a security policy at the lowest level, such as "no WEP key and no authentication".

In the following, the operation of the wireless LAN system of the second embodiment will be described. Incidentally, the wireless base station 5 operates in the same manner as described previously for the wireless base station 2 of the first embodiment to store configuration information in the configuration server 3, and therefore, the same description will not be repeated.

Figure 11:
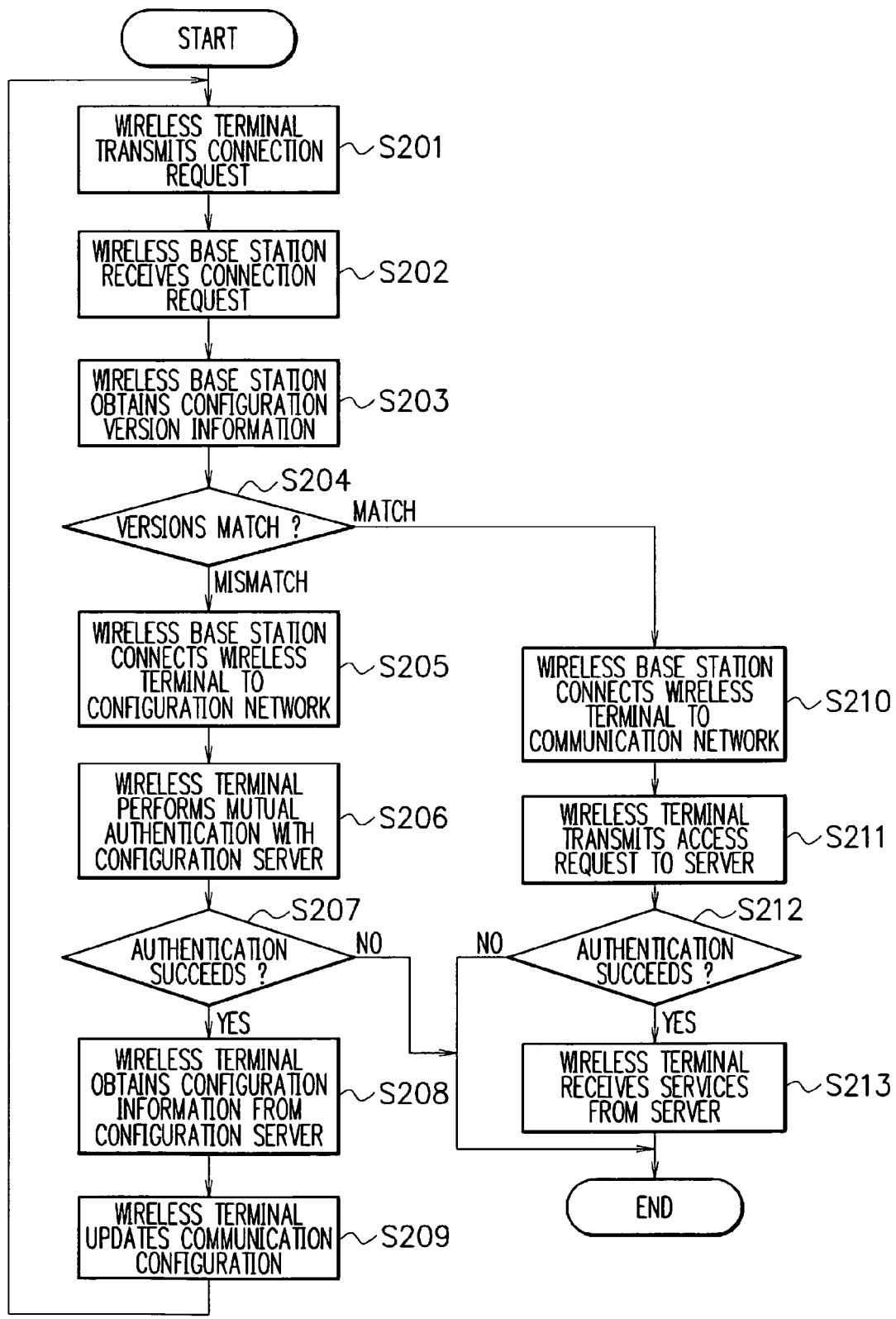
FIG. 11 is a flowchart showing the operation of the wireless LAN system.

FIG. 11 is a flowchart showing the operation of the wireless LAN system when the wireless terminal 1 is to receive services offered by the server 4.

First, the configuration information management section 13 transmits a connection request associated with configuration version information (the version of configuration information corresponding to the current configuration of the wireless terminal 1) currently stored in the configuration information storage 15 to the wireless base station 5 (step S201).

When the wireless base station 5 receives the connection request from the wireless terminal 1 (step S202), the wireless communication interface 51 obtains the configuration version information associated with the connection request (step S203). The wireless communication configuration management section 55 compares the configuration version information obtained from the wireless terminal 1 with that (the version of configuration information corresponding to the current configuration of the wireless base station 5) stored in the configuration information storage 56, thereby determining whether or not the versions of the configuration information match (step S204).

When the versions of the configuration information do not match between the wireless terminal 1 and the wireless base station 5 (step S204/MISMATCH), the communication management section 54 establishes a data transmission path to connect the terminal 1 to the configuration network so that data are exchanged through the configuration network communication interface 53 (step S205). The communication management section 54 informs the wireless terminal 1 that the terminal 1 is connected to the configuration network through the wireless communication interface 51.

Having been informed of the connection to the configuration network, the wireless terminal 1 performs mutual authentication with the configuration server 3 (step S206).

More specifically, the configuration information management section 13 transmits an authentication request to the configuration server 3 through the wireless communication interface 11. In response to the authentication request from the wireless terminal 1, the configuration server 3 performs prescribed authentication to inform the terminal 1 of the result of the authentication. If the authentication is successful, the configuration server 3 transmits its authentication request with the authentication result.

When the wireless terminal 1 receives the authentication request from the configuration server 3, the authentication information management section 14 authenticates the server 3 based on information stored in the authentication information storage 16. If the authentication is successful, the authentication information management section 14 informs the configuration server 3 of the successful authentication through the wireless communication interface 11.

On completion of the mutual authentication between the wireless terminal 1 and the configuration server 3 (step S207/YES), the configuration information management section 13 transmits a request for configuration information to the configuration server 3 through the wireless communication interface 11. The wireless terminal 1 receives configuration information transmitted by the configuration server 3 in response to the request (step S208).

Based on the configuration information newly obtained from the configuration server 3, the configuration information management section 13 updates the communication configuration of the wireless terminal 1 (step S209). The configuration information management section 13 stores configuration version information after the update in the configuration information storage 15.

If the mutual authentication between the wireless terminal 1 and the configuration server 3 fails (step S207/NO), the process ends.

When the versions of the configuration information match between the wireless terminal 1 and the wireless base station 5 (step S204/MATCH), the communication management section 54 establishes a data transmission path to connect the terminal 1 to the communication network (step S210). The communication management section 54 informs the wireless terminal 1 of the allowance of the connection request through the wireless communication interface 51.

When the wireless terminal 1 is informed that the terminal 1 has been allowed to connect to the wireless base station 5, the authentication information management section 14 requests the communication controller 12 to transmit an access request to the server 4 on the communication network (step S211).

In response to the access request from the wireless terminal 1, the server 4 performs prescribed authentication (step S212). If the authentication is successful (step S212/YES), the server 4 establishes communication with the wireless terminal 1.

After communication is established between the wireless terminal 1 and the server 4, the service client section 17 communicates with the server 4 using TCP/IP or UDP/IP to receive services from the server 4 (step S213).

If the server 4 fails to authenticate the wireless terminal 1 (step S212/NO), the process ends.

Figure 12:
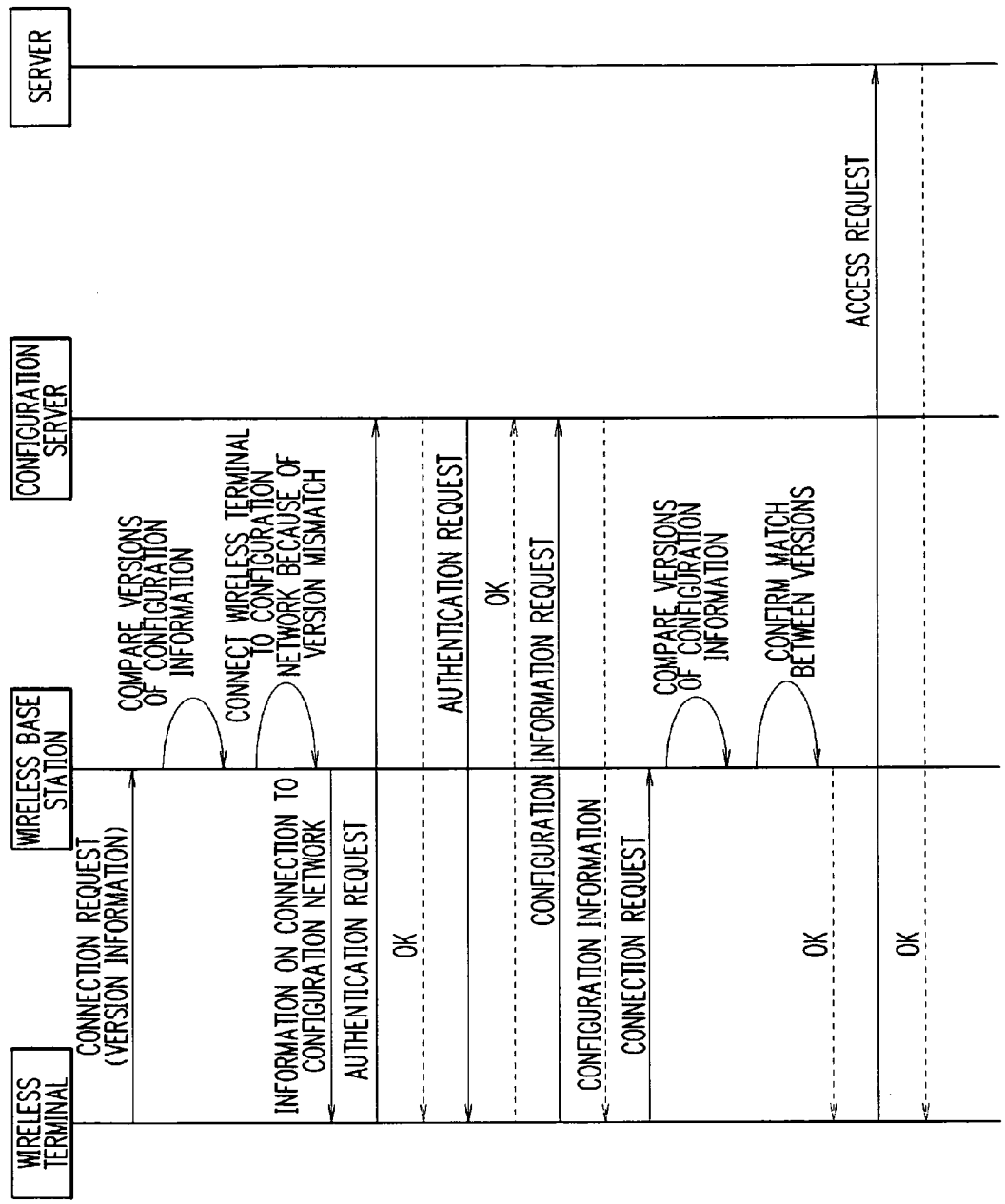
FIG. 12 is a sequence diagram showing an example of the operation of the wireless LAN system.

FIG. 12 is a sequence diagram showing an example of the operation of the wireless LAN system of this embodiment.

The configuration information management section 13 of the wireless terminal 1 transmits a connection request associated with configuration version information (the version of configuration information corresponding to the current configuration of the wireless terminal 1) currently stored in the configuration information storage 15 to the wireless base station 5.

When the wireless base station 5 receives the connection request from the wireless terminal 1, the wireless communication configuration management section 55 compares the configuration version information obtained from the wireless terminal 1 with that (the version of configuration information corresponding to the current configuration of the wireless base station 5) stored in the configuration information storage 56.

In FIG. 12, it is assumed that the versions of the configuration information do not match between the wireless terminal 1 and the wireless base station 5 at this time. Accordingly, the communication management section 54 establishes a data transmission path so that the wireless terminal 1 is connected to the configuration network (so that data are exchanged through the configuration network communication interface 53).

The communication management section 54 informs the wireless terminal 1 that the terminal 1 is connected to the configuration network through the wireless communication interface 51.

When the wireless terminal 1 is informed of the connection to the configuration network, the configuration information management section 13 transmits an authentication request to the configuration server 3 through the wireless communication interface 11.

In response to the authentication request from the wireless terminal 1, the configuration server 3 performs prescribed authentication. If the authentication is successful, the configuration server 3 informs the wireless terminal 1 of the successful authentication and transmits its authentication request to the terminal 1.

When the wireless terminal 1 receives the authentication request from the configuration server 3, the authentication information management section 14 authenticates the server 3 based on information stored in the authentication information storage 16. If the authentication is successful, the authentication information management section 14 informs the configuration server 3 of the successful authentication through the wireless communication interface 11.

On completion of the mutual authentication between the wireless terminal 1 and the configuration server 3, the configuration information management section 13 transmits a request for configuration information to the configuration server 3 through the wireless communication interface 11.

The configuration server 3 transmits configuration information to the wireless terminal 1 in response to the request therefrom.

Based on the configuration information newly obtained from the configuration server 3, the configuration information management section 13 updates the communication configuration of the wireless terminal 1. The configuration information management section 13 stores configuration version information after the update in the configuration information storage 15.

The authentication information management section 14 requests the communication controller 12 to transmit a connection request associated with configuration version information corresponding to the updated configuration of the wireless terminal 1 to the wireless base station 5.

When the wireless base station 5 receives the connection request from the wireless terminal 1, the wireless communication configuration management section 55 compares the configuration version information obtained from the wireless terminal 1 with that (the version of configuration information corresponding to the current configuration of the wireless base station 5) stored in the configuration information storage 56.

In FIG. 12, it is assumed that the versions of the configuration information match between the wireless terminal 1 and the wireless base station 5 at this time. Accordingly, the communication management section 54 establishes a data transmission path to connect the wireless terminal 1 to the communication network. The communication management section 54 informs the wireless terminal 1 of the allowance of the connection request through the wireless communication interface 51.

When the wireless terminal 1 is informed that the terminal 1 has been allowed to connect to the wireless base station 5, the authentication information management section 14 requests the communication controller 12 to transmit an access request to the server 4 on the communication network.

In response to the access request from the wireless terminal 1, the server 4 performs prescribed authentication to inform the terminal 1 of the result of the authentication.

After communication is established between the wireless terminal 1 and the server 4, the service client section 17 communicates with the server 4 using TCP/IP or UDP/IP to receive services from the server 4.

As is described above, in the wireless LAN system of the second embodiment, when the network topology has changed, the wireless terminal obtains configuration information from the configuration server.

Thus, the wireless terminal need not receive reissuance of an electronic ticket to connect to the wireless base station.

Incidentally, in the above description, the wireless terminal 1 transmits configuration version information with a connection request. However, configuration version information is not necessarily associated with a connection request, and they may be transmitted individually.

Third Embodiment

Figure 13:
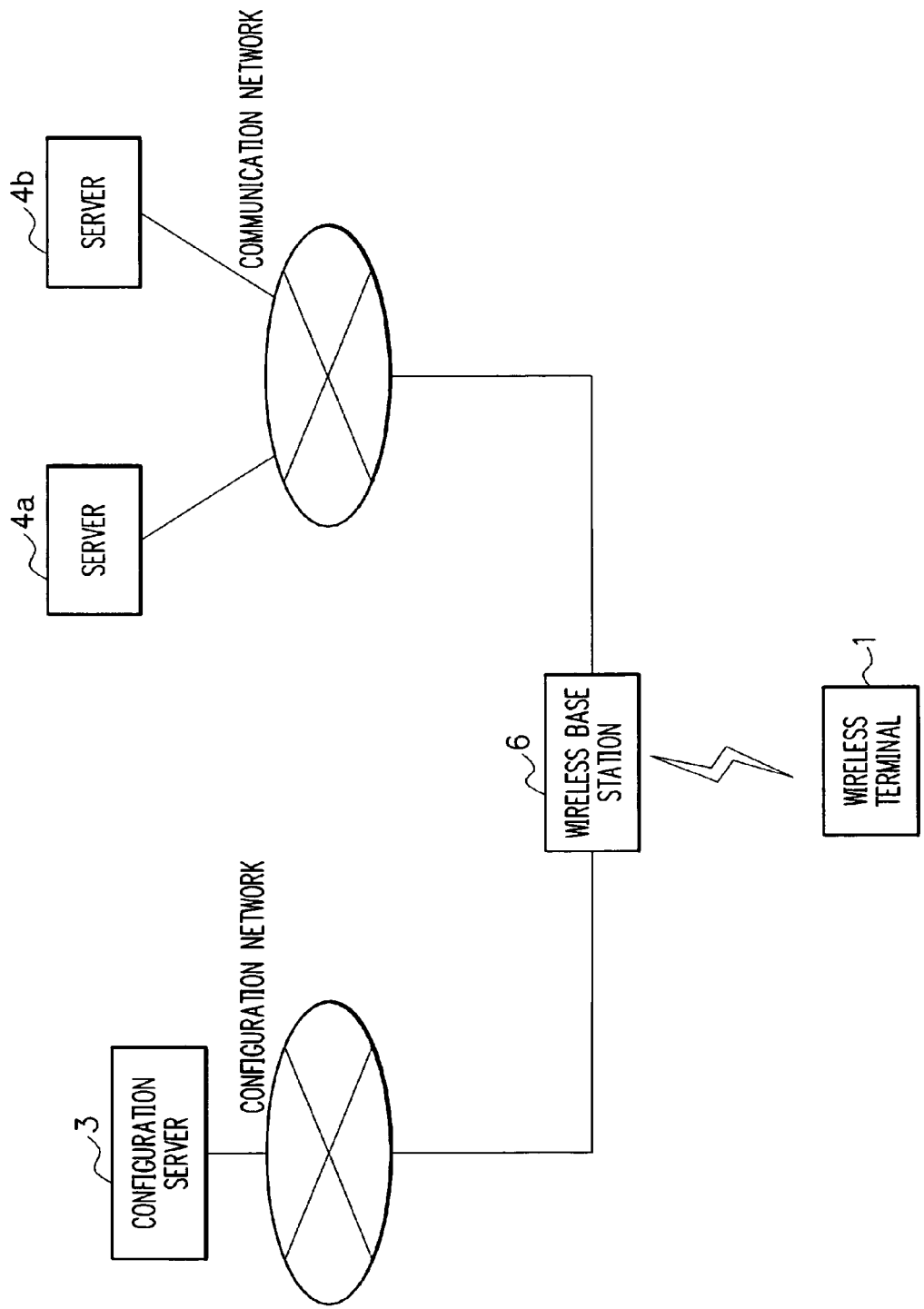
FIG. 13 is a block diagram showing the construction of a wireless LAN system according to the third embodiment of the present invention.

FIG. 13 is a block diagram showing the construction of a wireless LAN system according to the third embodiment of the present invention. Referring to FIG. 13, the wireless LAN system comprises a wireless terminal 1, a configuration server 3, servers 4 (4a and 4b), and a wireless base station 6.

FIG. 14 is a block diagram showing the construction of the wireless base station 6. The wireless base station 6 includes a wireless communication interface 61, an internal network communication interface 62, a communication management section 63, a wireless communication configuration management section 64, and a configuration information storage 65. The respective components of the wireless base station 6 are similar to those of the wireless base station 2 in the wireless LAN system of the first embodiment except that the communication management section 63 supports VLAN (Virtual Local Area Network: Virtual LAN).

In addition, the wireless terminal 1 of this embodiment has essentially the same construction as that of the first embodiment except that the communication controller 12 supports VLAN.

In this embodiment, the configuration network and the communication network are physically connected with each other, but logically separated as VLANs. More specifically, the configuration server 3 and the servers 4 (4a and 4b) are each provided with a different VLAN-ID. Consequently, when the wireless base station on the communication network receives a packet from the wireless terminal 1 to the configuration server 3, the base station discards the packet. Similarly, when the wireless base station on the configuration network receives a packet from the wireless terminal 1 to the server 4a or 4b, the base station discards the packet.

The wireless LAN system of this embodiment is equivalent to that of the second embodiment and operates in the same manner, and therefore, the same description will not be repeated.

The foregoing is considered as illustrative only of preferred embodiments of the present invention, and is not intended to limit the scope of the invention.

For example, in the above embodiments, only one wireless base station is located on the communication network. However, there may be any number of wireless base stations on the communication network.

In the above embodiments, a determination is made as to whether the wireless terminal 1 is to be connected to the configuration network or the communication network based on the version of configuration information of the terminal 1. However, the determination may be made based on a timestamp (the time when configuration version information was updated) instead of configuration version information. In this case, the wireless terminal is connected to the configuration network if a prescribed period of time has elapsed since the last update.

Further, in the above embodiments, the configuration information of the wireless base station changes according to a change in the network topology. However, a change in the configuration information of the wireless base station may be caused by other reasons than a network topology change. Besides, the wireless terminal may obtain configuration information when the terminal first connects to a wireless base station as well as when the configuration information of the wireless base station has changed.

Figure 15:
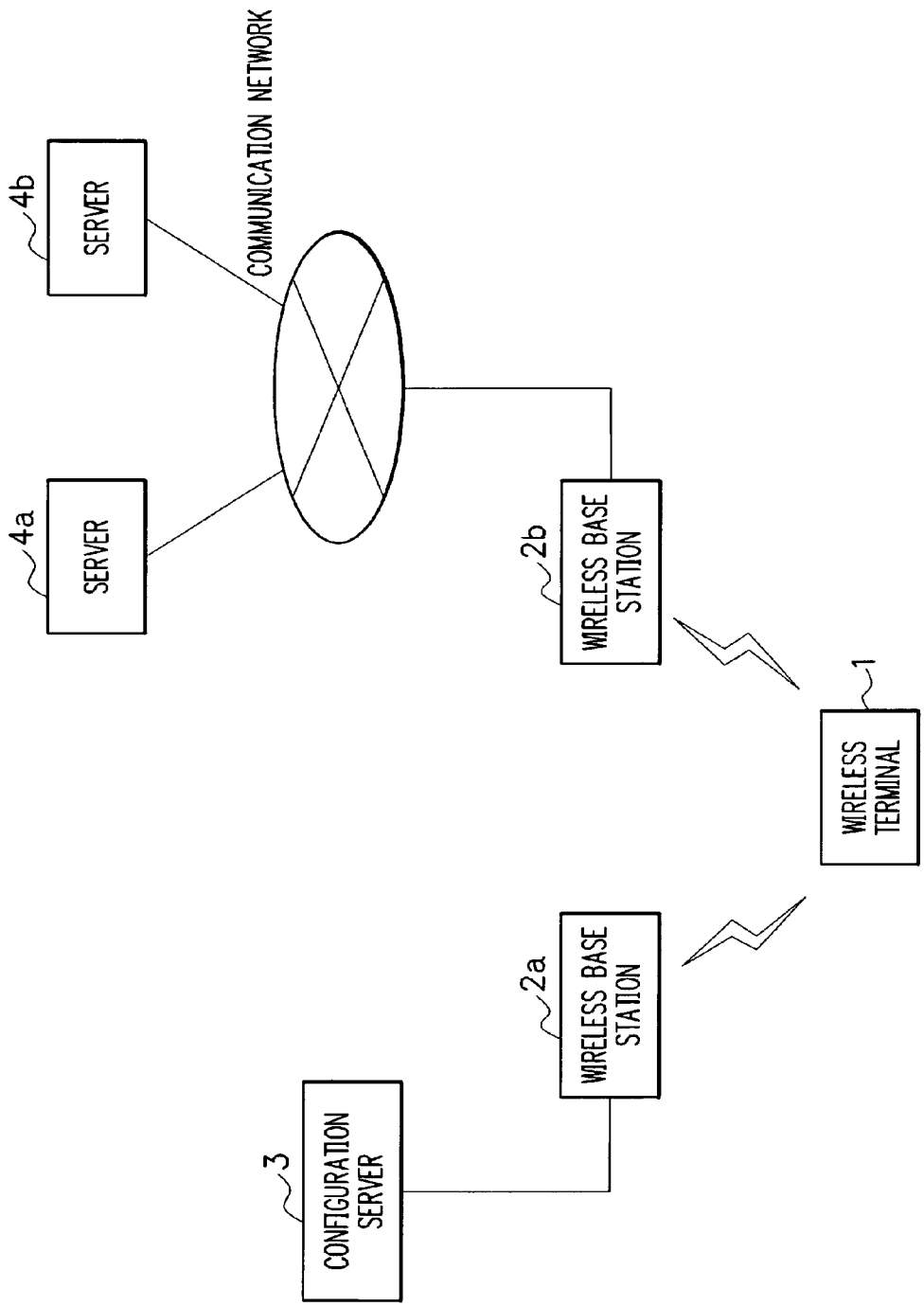
FIG. 15 is a block diagram showing the construction of a wireless LAN system in which a wireless base station is connected to a configuration server not through a network.

Still further, in the above embodiments, the wireless base station is connected to the configuration server via the configuration network. However, the wireless base station may be directly connected to the configuration server, not through a network, as shown in FIG. 15, or may be integrated with the configuration server as shown in FIG. 16.

Still further, in the above embodiments, when the configuration version information of the wireless terminal matches that of the wireless base station on the communication network, the terminal is allowed to connect to the base station. However, the wireless terminal may be allowed to connect to the wireless base station when the configuration information of the terminal is in a newer or later version than that of the base station.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A wireless LAN system comprising at least one wireless terminal in which communication configuration is set based on configuration information, a first wireless base station for connecting the wireless terminal that has connected thereto to a LAN, and a second wireless base station for connecting the wireless terminal that has connected thereto to a configuration server in a configuration network, wherein:

the first wireless base station includes:

a storage for storing configuration version information representing a version of configuration information to indicate that the wireless terminal whose communication configuration has been set based on the configuration information in the version is allowed to connect to the base station; and a configuration version information transmitter for transmitting the configuration version information to the wireless terminal;

the wireless terminal includes:

a configuration version information receiver for receiving the configuration version information from the first wireless base station;

a version comparator for determining whether or not the version of the configuration information based on which the communication configuration of the terminal has been set matches the version indicated by the configuration version information;

a connection request transmitter for transmitting a connection request to the second wireless base station when the version of the configuration information based on which the communication configuration of the terminal has been set does not match the version indicated by the configuration version information;

an authenticator for performing mutual authentication with the configuration server;

a configuration information receiver for obtaining configuration information previously stored in the configuration server that has already been authenticated; and a communication configuration changer for resetting the communication configuration of the terminal based on the configuration information obtained from the configuration server; and the configuration server includes:

a storage for storing the configuration information;

an authenticator for performing mutual authentication with the wireless terminal; and a configuration information transmitter for transmitting the configuration information to the wireless terminal that has already been authenticated in response to a request from the terminal, wherein the LAN and the configuration networks are separate.

2. The wireless LAN system claimed in claim 1, wherein:

the first wireless base station transmits a beacon containing the configuration version information; and the wireless terminal extracts and obtains the configuration version information from the beacon received from the first wireless base station.

3. A wireless LAN system comprising a first wireless base station for connecting a wireless terminal, in which communication configuration is set based on configuration information, to a LAN when the terminal has connected thereto, and a second wireless base station for connecting a wireless terminal that has connected thereto to a configuration server in a configuration network, wherein:

the first wireless base station includes:

a storage for storing configuration version information representing a version of configuration information to indicate that the wireless terminal whose communication configuration has been set based on the configuration information in the version is allowed to connect to the base station; and a configuration version information transmitter for transmitting the configuration version information to the wireless terminal; and the configuration server includes:

a storage for storing configuration information;

an authenticator for performing mutual authentication with the wireless terminal; and a configuration information transmitter for transmitting the configuration information to the wireless terminal that has already been authenticated in response to a request from the terminal, wherein the LAN and the configuration network are separate.

4. The wireless LAN system claimed in claim 3, wherein the first wireless base station transmits a beacon containing the configuration version information.

5. A wireless LAN system comprising at least one wireless terminal and a wireless base station for connecting the wireless terminal that has connected thereto to a LAN or a configuration server in a configuration network, wherein:

the wireless base station includes:

a storage for storing base station configuration version information representing a version of configuration information to indicate that the wireless terminal whose communication configuration has been set based on the configuration information in the version is allowed to connect to the LAN;

a connection determining section for determining, in response to a connection request received from the wireless terminal, whether the terminal is to be connected to the LAN or the configuration server based on the base station configuration version information and terminal configuration version information contained in the connection request; and a connection informing section for informing the wireless terminal whether the terminal has been connected to the LAN or the configuration server;

the wireless terminal includes:

a terminal configuration version information transmitter for transmitting the terminal configuration version information that indicates the version of configuration information based on which the communication configuration of the terminal has been set to the wireless base station with the connection request;

an authenticator for performing mutual authentication with the configuration server when informed by the wireless base station that the terminal has been connected to the configuration server;

a configuration information receiver for obtaining configuration information previously stored in the configuration server that has already been authenticated; and a communication configuration changer for resetting the communication configuration of the terminal based on the configuration information obtained from the configuration server; and the configuration server includes:

a storage for storing the configuration information based on which the communication configuration of the wireless terminal is set to connect to the wireless base station;

an authenticator for performing mutual authentication with the wireless terminal; and a configuration information transmitter for transmitting the configuration information to the wireless terminal that has already been authenticated in response to a request from the terminal, wherein the LAN and the configuration network are separate.

6. A wireless LAN system including a wireless base station for connecting a wireless terminal, in which communication configuration is set based on configuration information, to a LAN or a configuration server in a configuration network when the terminal has connected thereto, wherein:

the wireless base station includes:

a storage for storing base station configuration version information representing a version of configuration information to indicate that the wireless terminal whose communication configuration has been set based on the configuration information in the version is allowed to connect to the LAN;

a connection determining section for determining, in response to a connection request received from the wireless terminal, whether the terminal is to be connected to the LAN or the configuration server based on the base station configuration version information and terminal configuration version information contained in the connection request indicating the version of the configuration information based on which the communication configuration of the terminal has been set; and a connection informing section for informing the wireless terminal whether the terminal has been connected to the LAN or the configuration server; and the configuration server includes:

a storage for storing configuration information that indicates the communication configuration for the wireless terminal to connect to the wireless base station;

an authenticator for performing mutual authentication with the wireless terminal; and a configuration information transmitter for transmitting the configuration information to the wireless terminal that has already been authenticated in response to a request from the terminal, wherein the LAN and the configuration network are separate.

7. The wireless LAN system claimed in claim 5, wherein:
the configuration server is located on a subnet logically different from the LAN; and
the wireless base station determines whether the wireless terminal, which has transmitted the connection request thereto, is to be connected to the LAN or the configuration server by a VLAN tag.

8. The wireless LAN system claimed in claim 6, wherein:
the configuration server is located on a subnet logically different from the LAN; and
the wireless base station determines whether the wireless terminal, which has transmitted the connection request thereto, is to be connected to the LAN or the configuration server by a VLAN tag.

9. A wireless terminal comprising:
a configuration version information receiver for receiving from a first wireless base station configuration version information representing a version of configuration information to indicate that the wireless terminal whose communication configuration has been set based on the configuration information in the version is allowed to connect to the base station;
a version comparator for determining whether or not the version of configuration information based on which the communication configuration of the terminal has been set matches the version indicated by the configuration version information obtained from the first wireless base station;
a connection request transmitter for transmitting a connection request to a second wireless base station when the version of configuration information based on which the communication configuration of the terminal has been set does not match the version indicated by the configuration version information;
an authenticator for performing mutual authentication with a configuration server connected to the second wireless base station;
a configuration information receiver for obtaining configuration information indicating the communication configuration for the wireless terminal to connect to the wireless base station previously stored in the configuration server that has already been authenticated; and
a communication configuration changer for resetting the communication configuration of the terminal based on the configuration information obtained from the configuration server,
wherein the configuration information comprises a header and configure; and
wherein the header includes the version of the configuration information and the configure includes the data for communication configuration.

10. The wireless terminal claimed in claim 9, wherein the wireless terminal extracts and obtains the configuration version information from a beacon received from the first wireless base station.

11. A wireless terminal which is connected to a LAN or a configuration server in a configuration network through a wireless base station, comprising:
a terminal configuration version information transmitter for transmitting terminal configuration version information that indicates the version of configuration information based on which the communication configuration of the terminal has been set to the wireless base station with a connection request;
a connection information receiver for receiving from the wireless base station information as to whether the terminal has been connected to the LAN or the configuration server;
an authenticator for performing mutual authentication with the configuration server when informed by the wireless base station that the terminal has been connected to the configuration server;
a configuration information receiver for obtaining configuration information indicating conditions to connect to the LAN previously stored in the configuration server that has already been authenticated; and
a communication configuration changer for resetting the communication configuration of the terminal based on the configuration information obtained from the configuration server,
wherein the LAN and the configuration networks are separate.

12. A wireless base station including a configuration version information transmitter for transmitting to a wireless terminal configuration version information representing a version of configuration information to indicate that the wireless terminal whose communication configuration has been set based on the configuration information in the version is allowed to connect to the base station,
wherein the configuration information comprises a header and configure; and
wherein the header includes the version of the configuration information and the configure includes the data for communication configuration.

13. The wireless base station claimed in claim 12, which transmits a beacon containing the configuration version information.

14. A wireless base station which connects a wireless terminal to a LAN or a configuration server in a configuration network, comprising:
a storage for storing base station configuration version information representing a version of configuration information to indicate that the wireless terminal whose communication configuration has been set based on the configuration information in the version is allowed to connect to the LAN;
a connection determining section for determining, in response to a connection request received from the wireless terminal, whether the terminal is to be connected to the LAN or the configuration server based on the base station configuration version information and terminal configuration version information contained in the connection request indicating the version of configuration information based on which the communication configuration of the terminal has been set; and
a connection informing section for informing the wireless terminal whether the terminal has been connected to the LAN or the configuration server,
wherein the LAN and the configuration networks are separate.

15. A program implementing a communication configuration method for a wireless terminal, the program causing a computer that controls the wireless terminal to perform the steps of:
receiving from a first wireless base station configuration version information representing a version of configuration information to indicate that the wireless terminal whose communication configuration has been set based on the configuration information in the version is allowed to connect to the base station;

determining whether or not the version of configuration information based on which the communication configuration of the terminal has been set matches the version indicated by the configuration version information obtained from the first wireless base station;

transmitting a connection request to a second wireless base station when the version of configuration information based on which the communication configuration of the terminal has been set does not match the version indicated by the configuration version information;

performing mutual authentication with a configuration server connected to the second wireless base station;

obtaining configuration information indicating the communication configuration for the wireless terminal to connect to the wireless base station previously stored in the configuration server that has already been authenticated; and resetting the communication configuration of the terminal based on the configuration information obtained from the configuration server, wherein the configuration information comprises a header and configure; and wherein the header includes the version of the configuration information and the configure includes the data for communication configuration.

16. The program claimed in claim 15, wherein the wireless terminal extracts and obtains the configuration version information from a beacon received from the first wireless base station.

17. A program implementing a communication configuration method for a wireless terminal, the program causing a computer that controls the wireless terminal connected to a LAN or a configuration server in a configuration network through a wireless base station to perform the steps of:

transmitting terminal configuration version information that indicates the version of configuration information based on which the communication configuration of the terminal has been set to the wireless base station;

receiving from the wireless base station information as to whether the terminal has been connected to the LAN or the configuration server in response to a connection request transmitted to the base station;

performing mutual authentication with the configuration server when informed by the wireless base station that the terminal has been connected to the configuration server;

obtaining configuration information indicating conditions to connect to the LAN from the configuration server that has already been authenticated; and resetting the communication configuration of the terminal based on the configuration information obtained from the configuration server, wherein the LAN and the configuration networks are separate.

18. The program claimed in claim 17, wherein the wireless terminal transmits the terminal configuration version information to the wireless base station with the connection request.

19. A communication configuration method for a wireless terminal applied to a wireless LAN system comprising at least one wireless terminal in which communication configuration is set based on configuration information, a first wireless base station for connecting the wireless terminal that has connected thereto to a LAN, and a second wireless base station for connecting the wireless terminal that has connected thereto to a configuration server in a configuration network, the method comprising the steps of:

transmitting, from the first wireless base station to the wireless terminal, configuration version information representing a version of configuration information to indicate that the wireless terminal whose communication configuration has been set based on the configuration information in the version is allowed to connect to the base station;

determining, by the wireless terminal, whether or not the version of the configuration information based on which the communication configuration of the terminal has been set matches the version indicated by the configuration version information obtained from the first wireless base station;

transmitting, by the wireless terminal, a connection request to the second wireless base station when the version of the configuration information based on which the communication configuration of the terminal has been set does not match the version indicated by the configuration version information;

performing mutual authentication between the wireless terminal and the configuration server;

requesting, by the wireless terminal, configuration information previously stored in the configuration server that has already been authenticated;

transmitting, by the configuration server, the configuration information to the wireless terminal that has already been authenticated in response to the request from the terminal; and resetting, by the wireless terminal, the communication configuration of the terminal based on the configuration information obtained from the configuration server, wherein the LAN and the configuration networks are separate.

20. The communication configuration method for a wireless terminal claimed in claim 19, wherein:

the first wireless base station transmits a beacon containing the configuration version information; and the wireless terminal extracts and obtains the configuration version information from the beacon received from the first wireless base station.

21. A communication configuration method for a wireless terminal applied to a wireless LAN system comprising at least one wireless terminal and a wireless base station for connecting the wireless terminal that has connected thereto to a LAN or a configuration server in a configuration network, the method comprising the steps of:

transmitting, from the wireless terminal to the wireless base station, terminal configuration version information that indicates the version of configuration information based on which the communication configuration of the terminal has been set;

transmitting, from the wireless terminal to the wireless base station, a connection request;

determining, by the wireless base station, in response to the connection request received from the wireless terminal, whether the terminal is to be connected to the LAN or the configuration server based on the terminal configuration version information received from the terminal and base station configuration version information representing a version of configuration information to indicate that the wireless terminal whose communication configuration has been set based on the configuration information in the version is allowed to connect to the LAN;

informing the wireless terminal by the wireless base station whether the terminal has been connected to the LAN or the configuration server;

performing, by the wireless terminal, mutual authentication with the configuration server when the terminal is informed by the wireless base station that the terminal has been connected to the configuration server;

requesting, by the wireless terminal, configuration information previously stored in the configuration server that has already been authenticated;

transmitting, by the configuration server, the configuration information to the wireless terminal that has already been authenticated in response to the request from the terminal; and resetting, by the wireless terminal, the communication configuration of the terminal based on the configuration information obtained from the configuration server, wherein the LAN and the configuration networks are separate.

22. The communication configuration method for a wireless terminal claimed in claim 21, wherein the wireless terminal transmits the terminal configuration version information to the wireless base station with the connection request.

23. The wireless LAN system claimed in claim 1, wherein the mutual authentication comprises:

the configuration server authenticating an authentication request from the wireless terminal; and the wireless terminal authenticating an authentication request from the configuration server.

24. The wireless LAN system claimed in claim 1, wherein the mutual authentication comprises:

the wireless terminal transmitting a first authentication request to the configuration server;

in response the authentication request, the configuration server performing a prescribed authentication and transmitting a second authentication request and a result of the authentication to the wireless terminal; and the wireless terminal receiving the second authentication request and performing authentication and transmitting a result of the authentication to the configuration server.

25. The wireless LAN system claimed in claim 1, wherein the configuration information is information necessary for the wireless terminal to access the LAN.

26. The wireless LAN system claimed in claim 1, wherein the configuration information sets the communication configuration of the wireless terminal.

\* \* \* \* \*